(12) United States Patent
Igeta et al.

(10) Patent No.: US 7,808,589 B2
(45) Date of Patent: Oct. 5, 2010

(54) TRANSFLECTIVE LIQUID CRYSTAL DISPLAY DEVICE HAVING PARTICULAR ANGLE BETWEEN INITIAL LIQUID CRYSTAL ALIGNMENT DIRECTION AND PIXEL ELECTRODE PROJECTION DIRECTION

(75) Inventors: Koichi Igeta, Chiba (JP); Junji Tanno, Chiba (JP); Hirotaka Imayama, Mobara (JP); Tetsuya Nagata, Mobara (JP)

(73) Assignee: Hitachi Displays, Ltd., Chiba-ken (JP)

( * ) Notice: Subject to any disclaimer, the term of this patent is extended or adjusted under 35 U.S.C. 154(b) by 500 days.

(21) Appl. No.: 11/878,422

(22) Filed: Jul. 24, 2007

(65) Prior Publication Data
US 2008/0030663 A1    Feb. 7, 2008

(30) Foreign Application Priority Data
Aug. 3, 2006    (JP)    ............... 2006-212236

(51) Int. Cl.
*G02F 1/1335* (2006.01)
*G02F 1/1343* (2006.01)
(52) U.S. Cl. .................. 349/114; 349/141; 349/144
(58) Field of Classification Search .......... 349/110, 349/114, 141, 144
See application file for complete search history.

(56) References Cited

U.S. PATENT DOCUMENTS

| | | | | |
|---|---|---|---|---|
| 5,583,675 | A | * | 12/1996 | Yamada et al. ............. 349/84 |
| 5,946,066 | A | * | 8/1999 | Lee et al. ............. 349/141 |
| 5,946,067 | A | * | 8/1999 | Kim et al. ............. 349/141 |
| 2005/0264720 | A1 | * | 12/2005 | Itou et al. ............. 349/99 |
| 2006/0268206 | A1 | * | 11/2006 | Nishimura ............. 349/114 |

FOREIGN PATENT DOCUMENTS

| JP | 2003-344837 | 5/2002 |
|---|---|---|
| JP | 2005-338256 | 5/2004 |

\* cited by examiner

*Primary Examiner*—Michael H Caley
(74) *Attorney, Agent, or Firm*—Stites & Harbison, PLLC; Juan Carlos A. Marquez, Esq

(57) ABSTRACT

In a transflective liquid crystal display device, assuming that a narrower angle among angles formed by the initial liquid crystal alignment direction of a liquid crystal layer, and the projection direction of a pixel electrode of a transmissive unit is θt and that a narrower angle among angles formed by the initial liquid crystal alignment direction of the liquid crystal layer, and the projection direction of a pixel electrode of a reflective unit is θr, (1) when the liquid crystal layer possesses a positive-type liquid crystal, the relation of θt>θr is satisfied, and (2) when the liquid crystal layer possesses a negative-type liquid crystal, the relation of θr>θt is satisfied. The relations are satisfied by slanting or bending at least one of the pixel electrodes, and the reflectivity is improved.

20 Claims, 20 Drawing Sheets

C -------- C'

$|\theta t\_p| = |\theta r\_p|$ $|\theta t\_n|=|\theta r\_n|$ $|\theta t_p| > |\theta r_p|$ $|\theta r\_n| > |\theta t\_n|$ $|\theta r\_n| > |\theta t\_n|$

TRANSFLECTIVE LIQUID CRYSTAL DISPLAY DEVICE HAVING PARTICULAR ANGLE BETWEEN INITIAL LIQUID CRYSTAL ALIGNMENT DIRECTION AND PIXEL ELECTRODE PROJECTION DIRECTION

CLAIM OF PRIORITY

The present application claims priority from Japanese Application JP 2006-212236 filed on Aug. 3, 2006, the content of which is hereby incorporated by reference into this application.

BACKGROUND OF THE INVENTION (1) Field of the Invention

The present invention relates to transflective liquid crystal display devices, more particularly, to an art which is effective in applying the transflective liquid crystal display device to an IPS (In Plane Switching) mode.

(2) Description of the Related Art

A transflective liquid crystal display device which has a transmissive unit and a reflective unit in one sub-pixel is used as a display for portable devices.

The transflective liquid crystal display device employs a vertical electric field system in which electric field is impressed to a liquid crystal interposed between a pair of substrates, in the direction perpendicular to the substrate plane of the pair of substrates, thereby driving the liquid crystal. In this case, in order to match the property of the transmissive unit to the property of the reflective unit, a level difference is prepared between the transmissive unit and the reflective unit, and furthermore a retardation film is prepared between a polarizing plate and the liquid crystal layer.

On the other hand, as one of liquid crystal display devices, an in-plane-switching (IPS)-mode liquid crystal display device is well known. In the IPS-mode liquid crystal display device, a pixel electrode (PIX) and an opposed electrode (CT) are formed on the same substrate, and electric field is impressed between the electrodes to rotate the liquid crystal in the substrate plane, thereby performing light and dark control. Therefore, there is a feature that the lightness and darkness of a display image is not reversed even when the screen is seen from at an oblique angle. In order to efficiently use this feature, composing a transflective liquid crystal display device by employing the IPS-mode liquid crystal display device is proposed, for example, by Japanese Patent Application Laid-Open Publication No. 2003-344837 and Japanese Patent Application Laid-Open Publication No. 2005-338256.

As a method of composing the transflective liquid crystal display device with the IPS mode, in Japanese Patent Application Laid-Open Publication No. 2003-344837, a half-wave plate is prepared in a transmissive area and a reflective area, and the transmissive area is driven by a lateral electric field and the reflective area is driven by a vertical electric field. On the other hand, in Japanese Patent Application Laid-Open Publication No. 2005-338256, a half-wave plate is prepared only in the reflective area, and the transmissive area and the reflective area are both driven by a lateral electric field.

SUMMARY OF THE INVENTION

However, in any one of Japanese Patent Application Laid-Open Publication No. 2003-344837 and Japanese Patent Application Laid-Open Publication No. 2005-338256, when a narrower angle among angles formed by the initial liquid crystal alignment direction of the liquid crystal layer and the projection direction of the pixel electrode of the transmissive unit is defined as θt, and when a narrower angle among angles formed by the initial liquid crystal alignment direction of the liquid crystal layer and the projection direction of the pixel electrode of the reflective unit is defined as θr, the relation of θt=θr is satisfied (when simply rephrased, the projection direction of the pixel electrode is equal in the transmissive unit and the reflective unit). It is necessary to set the cell gap length of the reflective unit to the half of the cell gap length of the transmissive unit, in the transflective display. However, in the IPS mode, when the cell gap length is narrowed, the drive voltage unfavorably rises. Therefore, the voltage-reflectivity characteristics of the reflective unit are shifted to the high-voltage side compared with the voltage-transmissivity characteristics of the transmissive unit, and sufficient reflectivity can not be obtained. This fact may cause a problem.

The present invention has been made in order to address the problem of the conventional technology as described above and provides a technology which can improve the reflectivity of the transflective liquid crystal display device.

What the present invention can provide as described above and others and new features will be clarified by the description of the present specification and the accompanying drawings.

Typical one of the inventions to be disclosed by the present application is briefly outlined as follows.

In the transflective liquid crystal display device, a liquid crystal drive voltage is generally decided on the basis of the voltage-transmission efficiency characteristics of the transmissive unit. That is, in the case of a normally-black mode, a voltage which produces a maximum transmissivity is defined as the maximum voltage, and, in the case of a normally-white mode, a voltage which produces a minimum transmissivity is defined as the maximum voltage. On the other hand, in the transflective display panel, it is difficult for the reflective unit to obtain the highest display efficiency, since the drive voltage of the reflective unit is decided one-sidedly by the drive voltage of the transmissive unit.

What is necessary to overcome such difficulties and to obtain a high reflectivity is just to make the shape of the voltage-reflective efficiency characteristics of the reflective unit similar to the shape of the voltage-transmission efficiency characteristics of the transmissive unit.

Therefore, in the present invention, assuming that a narrower angle among angles formed by the initial liquid crystal alignment direction of the liquid crystal layer and the projection direction of the pixel electrode of the transmissive unit is θt and that a narrower angle among angles formed by the initial liquid crystal alignment direction of the liquid crystal layer and the projection direction of the pixel electrode of the reflective unit is θr, (1) when the liquid crystal layer is a positive-type liquid crystal, the relation of θt>θr is satisfied, and
(2) when the liquid crystal layer is a negative-type liquid crystal, the relation of θr>θt is satisfied.

In addition, in the following description of "DETAILED DESCRIPTION OF THE PREFERRED EMBODIMENTS", when the liquid crystal layer is a positive-type liquid crystal, an angle θt in the transmissive unit is expressed as θt_p and an angle θr in the reflective unit is expressed as θr_p, and when the liquid crystal layer is a negative-type liquid crystal, an angle θt in the transmissive unit is expressed as θt_n and an angle θr in the reflective unit is expressed as θr_n.

The effect obtained by the typical one of the inventions to be disclosed by the present application is briefly explained as follows.

According to the embodiments of the present invention, it is possible to improve the reflectivity of the transflective liquid crystal display device.

BRIEF DESCRIPTION OF THE DRAWINGS

Embodiments of the present invention will be described in detail with reference to the following figures, wherein.

DETAILED DESCRIPTION OF THE PREFERRED EMBODIMENTS

Hereinafter, with reference to the accompanying drawings, the embodiments of the present invention are explained in detail.

In all the figures for explaining the embodiments of the present invention, parts and elements which have the same function are given the same reference numbers, and repetitive explanation thereof is appropriately omitted.

[Transflective Liquid Crystal Display Device as a Premise for the Present Invention]

Figure 1:
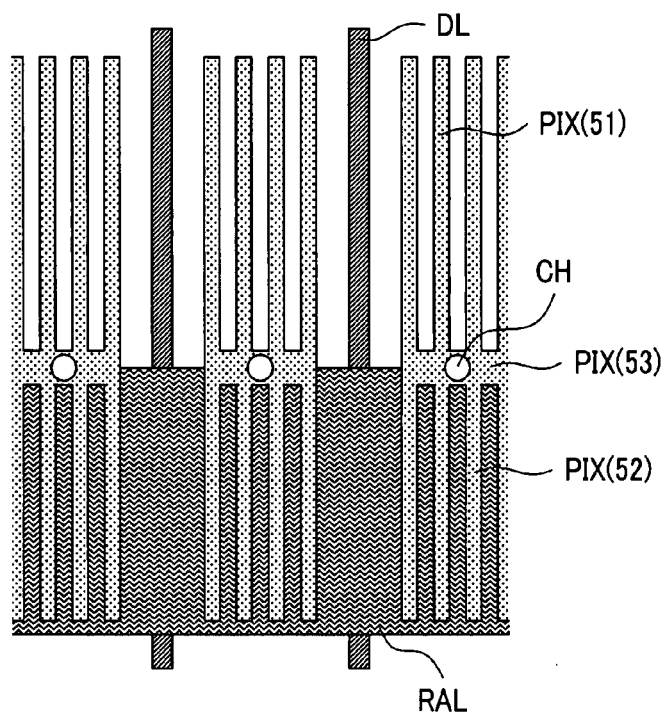
FIG. 1 is a top view illustrating one sub-pixel on the side of a TFT substrate in a transflective liquid crystal display device which is the premise for the present invention.
Figure 2:
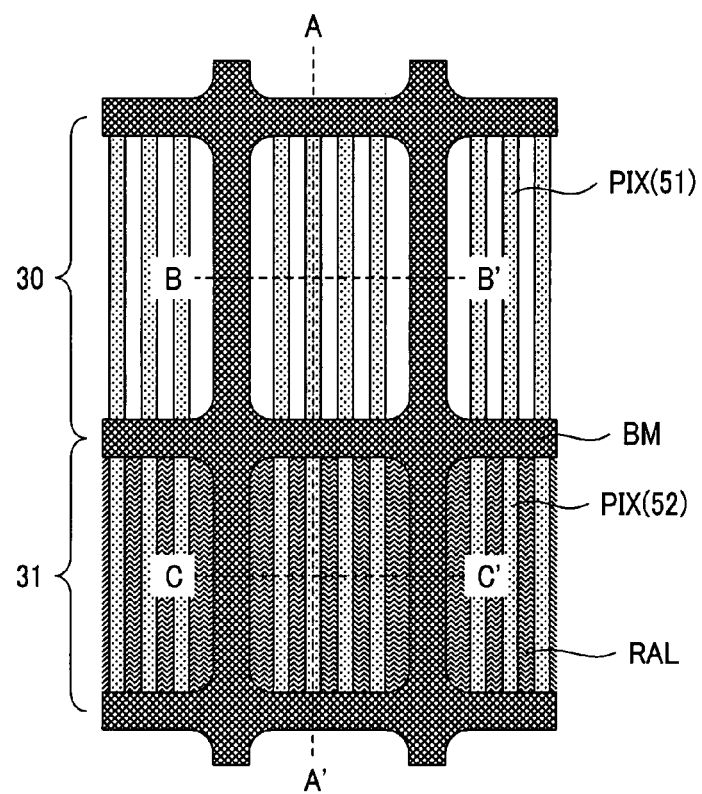
FIG. 2 is a top view illustrating one sub-pixel when the TFT substrate of FIG. 1 and a CF substrate are superposed.
Figure 3:
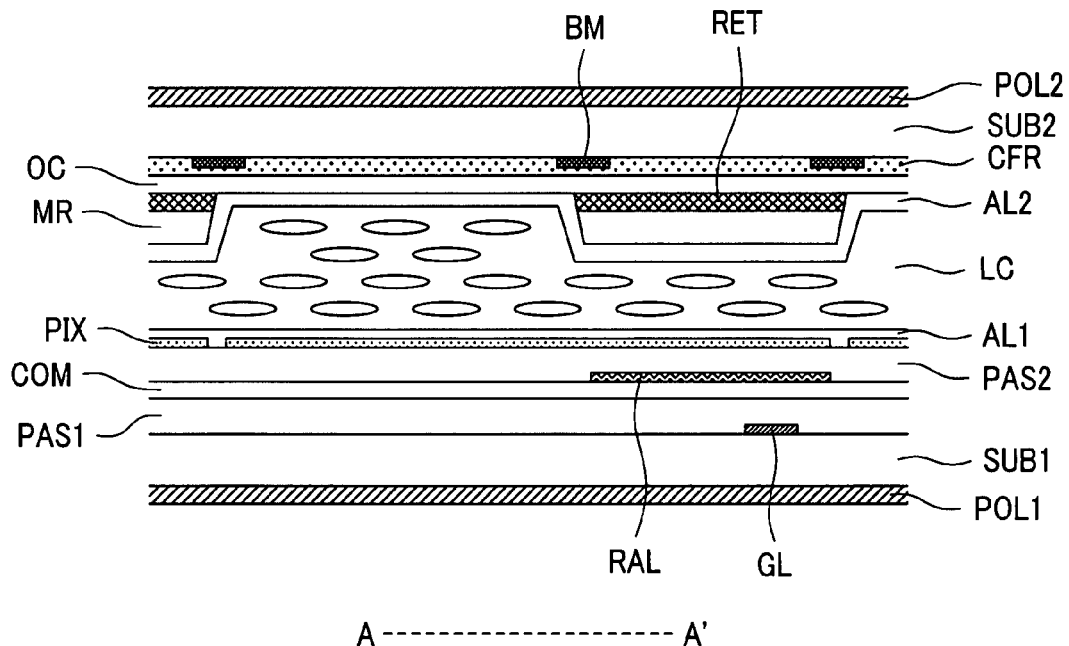
FIG. 3 is a cross-sectional view illustrating a cross-sectional structure taken along a line A-A' of FIG. 2.
Figure 4:
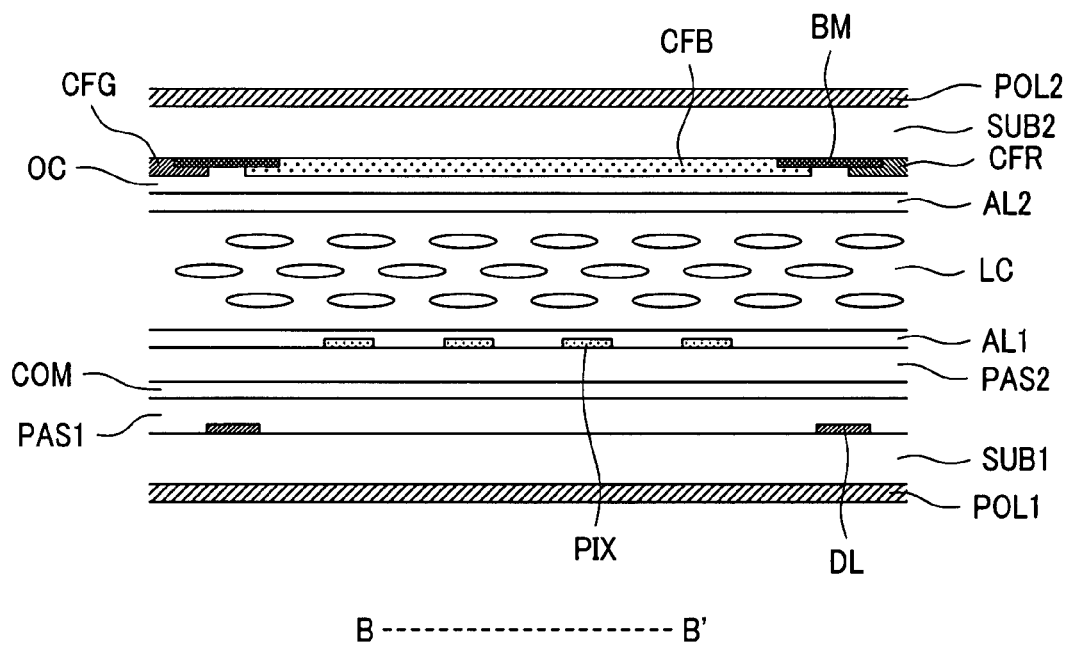
FIG. 4 is a cross-sectional view illustrating a cross-sectional structure taken along a line B-B' of FIG. 2.
Figure 5:
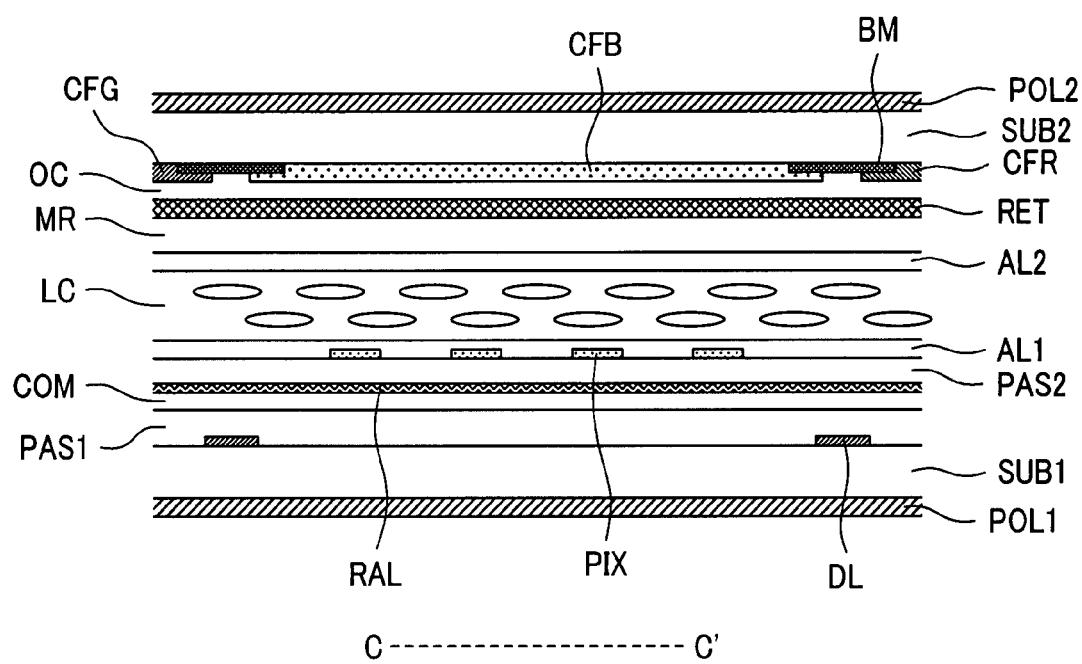
FIG. 5 is a cross-sectional view illustrating a cross-sectional structure taken along a line C-C' of FIG. 2.

FIG. 1 is a top view illustrating one sub-pixel on the side of a TFT substrate in a transflective liquid crystal display device which is the premise for the present invention. FIG. 2 is a top view illustrating one sub-pixel when the TFT substrate of FIG. 1 and a CF substrate are superposed. FIG. 3 is a cross-sectional view illustrating a cross-sectional structure taken along a line A-A' of FIG. 2, FIG. 4 is a cross-sectional view illustrating a cross-sectional structure taken along a line B-B' of FIG. 2, and FIG. 5 is a cross-sectional view illustrating a cross-sectional structure taken along a line C-C' of FIG. 2.

In addition, FIG. 2 shows a transmissive unit 30 and a reflective unit 31. FIG. 3 shows the cross-sectional structure of the transmissive unit 30 and the reflective unit 31. FIG. 4 shows the cross-sectional structure of the transmissive unit 30. FIG. 5 shows the cross-sectional structure of the reflective unit 31.

In the transflective liquid crystal display device shown in FIG. 1, a pair of glass substrates (SUB1, SUB2) are prepared, and the liquid crystal layer (LC) containing many liquid crystal molecules is interposed between the pair of glass substrates. The principal surface side (or the top surface side) of the glass substrate (SUB2) is an observation side.

In the liquid-crystal-layer side of the glass substrate (SUB2; it is also called a CF substrate), the following layers are formed in the order from the glass substrate (SUB2) to the liquid crystal layer (LC): a light blocking film (BM) and red, green, and blue color filters (CFR, CFG, CFB), an overcoat (OC), a retardation film (a half-wave plate) (RET) operable to change the polarization state of light, a step forming layer (MR), and an alignment film (AL2). In addition, on the outer side of the glass substrate (SUB2), a polarizing plate (POL2) is formed. The step forming layer (MR) is prepared corresponding to the reflective unit 31.

Moreover, in the liquid-crystal-layer side of the glass substrate (SUB1; it is also called a TFT substrate), the following layers are formed in the order from the glass substrate (SUB1) to the liquid crystal layer (LC): a video line (DL; it is also called a source line or a drain line), an insulating film (PAS1), an opposed electrode (COM; it is also called a common electrode) and a reflective electrode (RAL), an insulating film (PAS2), a pixel electrode (PIX), and an alignment film (AL1). In addition, on the outer side of the glass substrate (SUB1), a polarizing plate (POL1) is formed.

Moreover, the opposed electrode (COM) is formed substantially planer in shape. Furthermore, the pixel electrode (PIX) and the opposed electrode (COM) are superposed through an intermediate insulating film (PAS2), thereby functioning as a holding capacity. The pixel electrode (PIX) and the opposed electrode (COM) are composed by a transparent conductive film, such as an ITO (Indium Tin Oxide) film or the like. In addition, the insulating film (PAS2) may not be limited to one layer; alternatively it may be formed by two or more layers.

The reflective unit 31 possesses a reflective electrode (RAL). The reflective electrode (RAL) is formed by a metal film of aluminum (Al), or it may be formed in the two-layer structure composed of a molybdenum (Mo) lower layer and an aluminum (Al) upper layer.

The pixel electrode (PIX) is formed in a comb electrode structure composed of: a connecting section 53 which projects along the projection direction of a scanning line (GL); plural linear sections (a comb part) 51 which are pulled out from the connecting section 53 to the side of the transmissive unit 30 and each of the plural linear sections 51 is arranged at a predetermined spacing along the projection direction of a scanning line (GL); and plural linear sections (a comb part) 52 which are pulled out from the connecting section 53 to the side of the reflective unit 31 and each of the plural linear sections 52 is arranged at a predetermined spacing along the projection direction of the scanning line (GL).

In the transflective liquid crystal display device shown in FIG. 1, the pixel electrode (PIX) and the planer opposed electrode (COM) are laminated with the insulating film (PAS2) as an intermediate layer. Arch-shaped electric lines of force formed between the pixel electrode (PIX) and the opposed electrode (COM) are distributed so as to pass through the liquid crystal layer (LC), thereby changing the alignment of the liquid crystal layer (LC). The line width of the linear sections (51, 52) of the pixel electrode (PIX) is 4 µm, and the gap width of the linear sections (51, 52) of the pixel electrode (PIX) is 6 µm. In this condition, the balance of torque, which is exerted on the liquid crystal layer (LC) by the density of the electric lines of force and the adjoining electric lines of force, is kept comparatively good; thereby transmission display and reflective display both become possible.

The cell gap length of the reflective unit 31 is set as about half of the cell gap length of the transmissive unit 30. This is for setting the optical path lengths in the transmissive unit 30 and the reflective unit 31 to be roughly equal, since light passes the reflective unit 31 twice in one round trip.

In the transmissive unit 30, the contrasting of light is displayed using the birefringence nature of the liquid crystal layer (LC). As opposed to this, in the reflective unit 31, the contrasting of light is displayed using a retardation film (a half-wave plate) (RET) arranged inside the liquid crystal display panel, and the birefringence nature of the liquid crystal layer (LC).

In the transflective liquid crystal display device shown in FIG. 1, a light blocking film (BM) is arranged in the boundary section of the adjoining sub-pixels in the vertical and horizontal directions. Thereby, the optical leakage and color mixture to the adjacent sub-pixels can be prevented. However, the aperture ratio thereof will fall.

Figure 6:
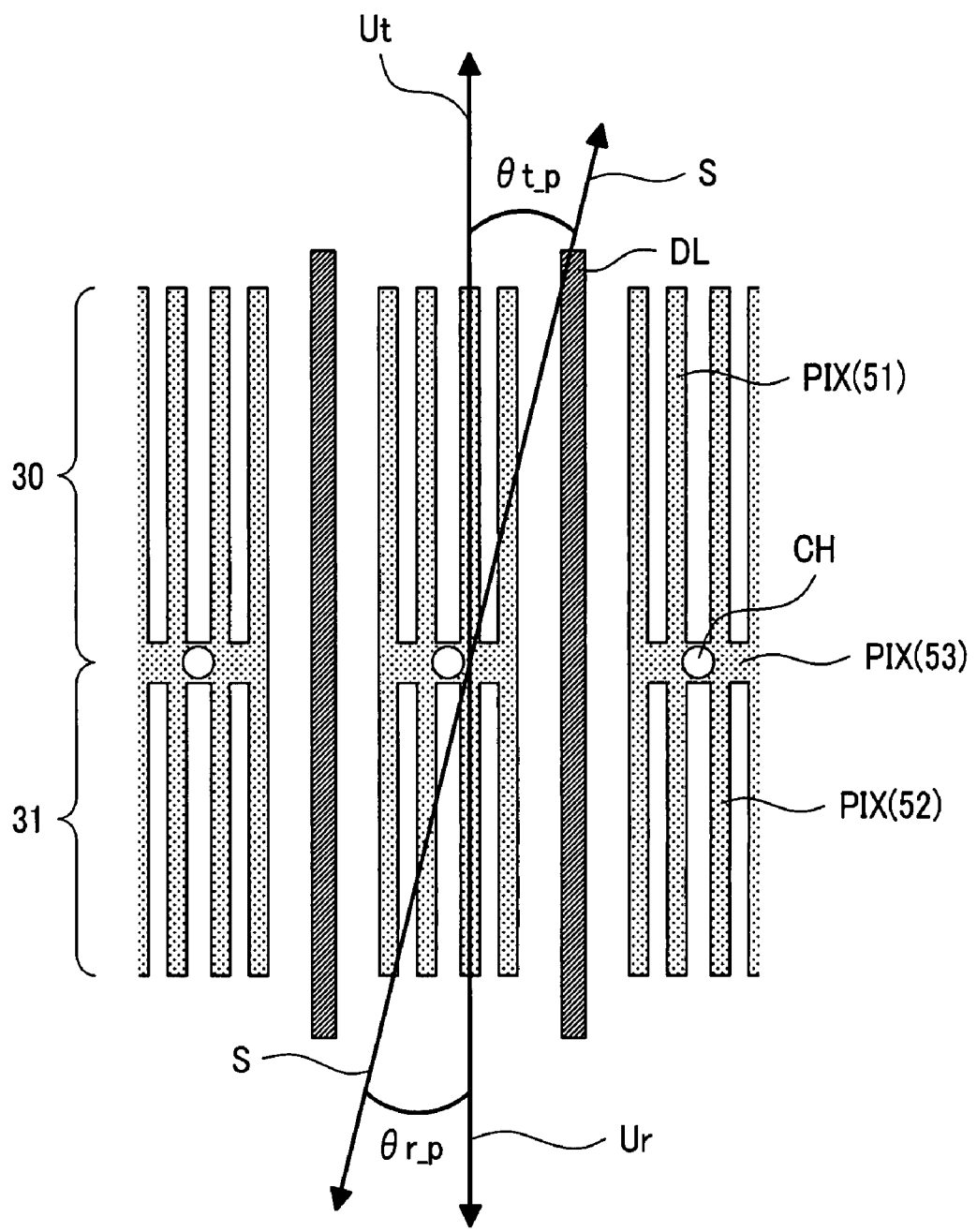
FIG. 6 is a diagram illustrating the relationship between an initial liquid crystal alignment direction and a projection direction of a pixel electrode when a positive-type liquid crystal is used in the transflective liquid crystal display device shown in FIG. 1.

FIG. 6 illustrates the relationship between the initial liquid crystal alignment direction (S) and the projection direction of the pixel electrode (PIX) when a positive-type liquid crystal is used. When a narrower angle among angles formed by the initial liquid crystal alignment direction (S) of the liquid crystal layer (LC) and the projection direction (Ut) of the pixel electrode (PIX) (the linear section 51) of the transmissive unit 30 is defined as θt_p, and when a narrower angle among angles formed by the initial liquid crystal alignment direction (S) of the liquid crystal layer (LC) and the projection direction of the pixel electrode (PIX) (the linear section 52) of the reflective unit 31 is defined as θr_p, the transflective liquid crystal display device shown in FIG. 1 satisfies the relation of |θt_p|=|θr_p| in the case of the positive-type liquid crystal.

Figure 7:
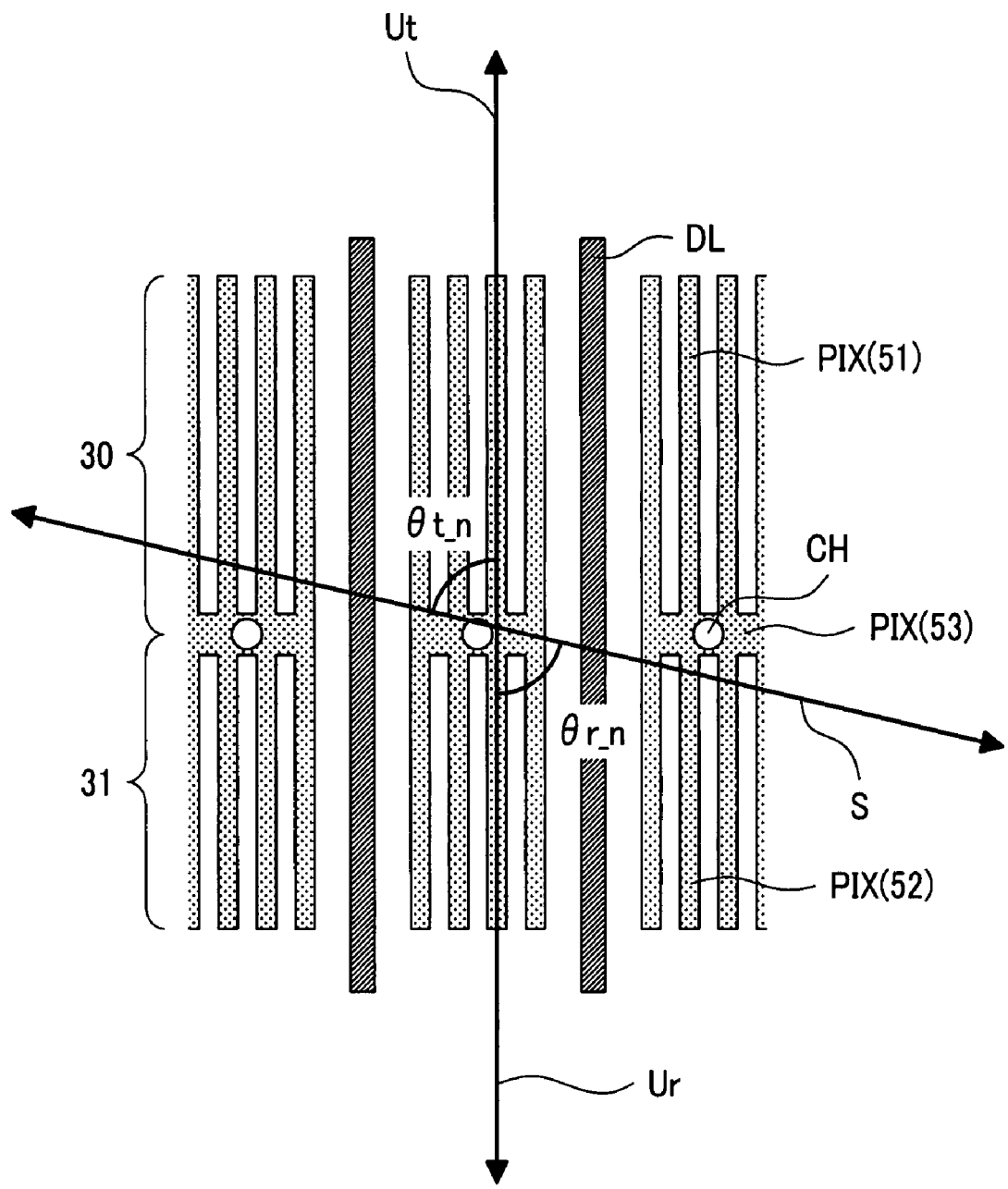
FIG. 7 is a diagram illustrating the relationship between an initial liquid crystal alignment direction and a projection direction of a pixel electrode when a negative-type liquid crystal is used in the transflective liquid crystal display device shown in FIG. 1.

FIG. 7 illustrates the relationship between the initial liquid crystal alignment direction (S) and the projection direction of the pixel electrode (PIX), when a negative-type liquid crystal is used. When a narrower angle among angles formed by the initial liquid crystal alignment direction (S) of the liquid crystal layer (LC) and the projection direction (Ut) of the pixel electrode (PIX) (the linear section 51) of the transmissive unit 30 is defined as θt_n, and when a narrower angle among angles formed by the initial liquid crystal alignment direction (S) of the liquid crystal layer (LC) and the projection direction (Ur) of the pixel electrode (PIX) (the linear section 52) of the reflective unit 31 is defined as θr_n, the transflective liquid crystal display device shown in FIG. 1 satisfies the relation of |θt_n|=|θr_n| in the case of the negative-type liquid crystal.

Figure 8:
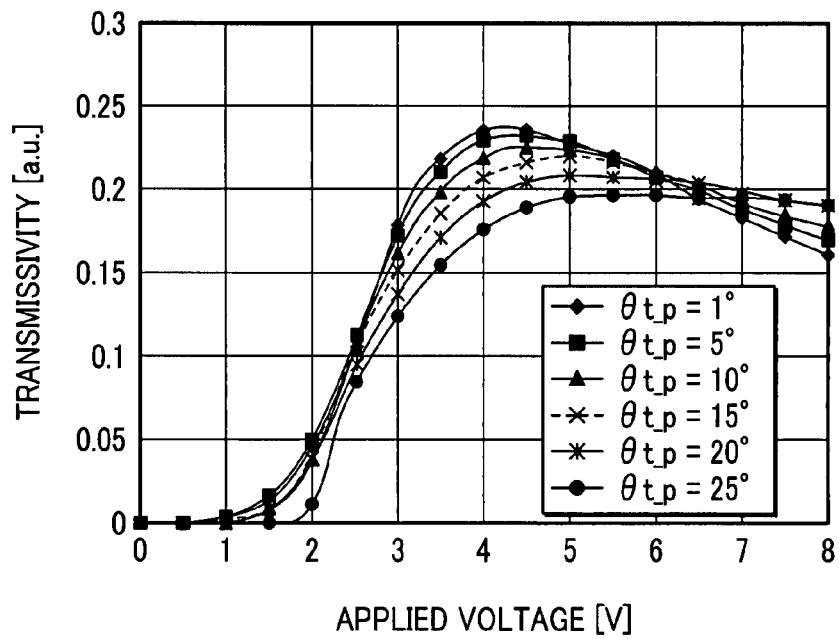
FIG. 8 is a graph illustrating θt dependence of voltage-transmissivity characteristics for a transmissive unit when a positive-type liquid crystal is used in the transflective liquid crystal display device shown in FIG. 1.

FIG. 8 illustrates θt_p dependence of the voltage-transmissivity characteristics of the transmissive unit 30 when the positive-type liquid crystal is used. There is a tendency that as θt_p decreases, the drive voltage becomes lower and the transmissivity in the transmissive unit 30 becomes higher. In addition, although not explained in full detail here, there is unfavorable effect that the response time of liquid crystal is retarded, as θt_p decreases. Therefore, it cannot be completely concluded that the smaller the value of θt_p is, the better the performance is.

Figure 9:
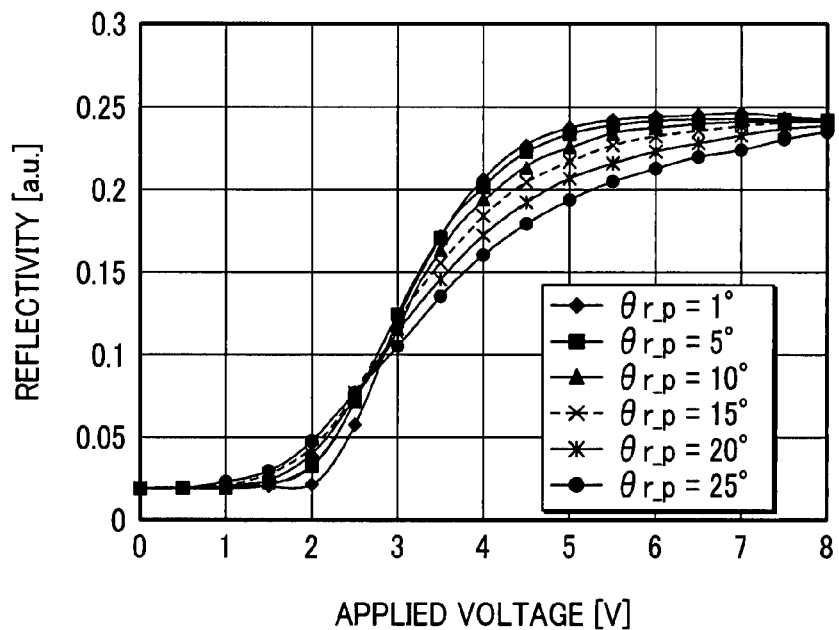
FIG. 9 is a graph illustrating θr dependence of voltage-reflectivity characteristics for a reflective unit when a positive-type liquid crystal is used in the transflective liquid crystal display device shown in FIG. 1.

FIG. 9 illustrates θr_p dependence of the voltage-reflectivity characteristics of the reflective unit 31 when the positive-type liquid crystal is used. There is a tendency that as θr_p decreases, the drive voltage becomes lower and the reflectivity in the reflective unit 31 becomes higher.

Figure 10:
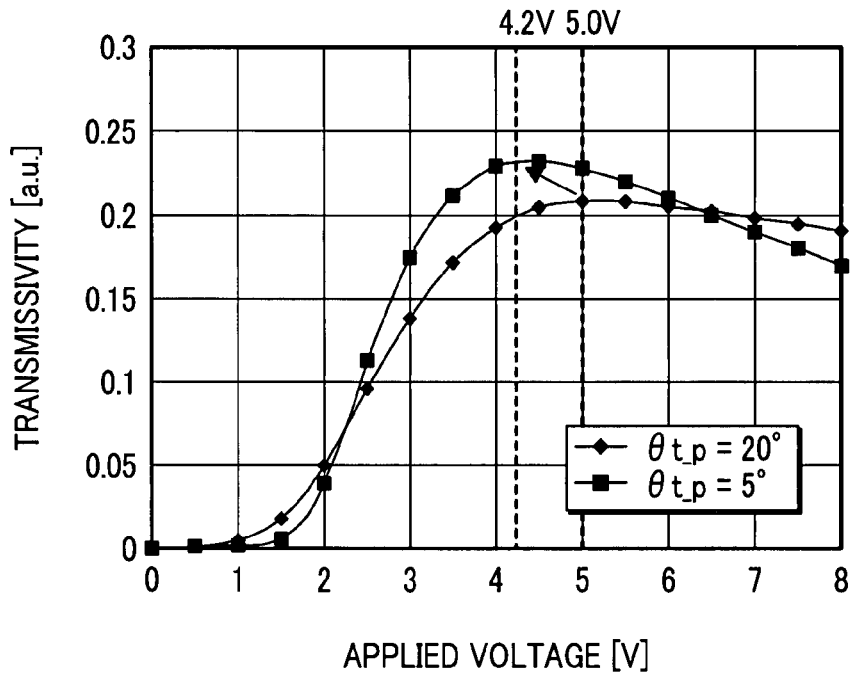
FIG. 10 is a graph illustrating a specific example (cases of θt=20° and 5°) in the θt dependence of the voltage-transmissivity characteristics for the transmissive unit when a positive-type liquid crystal is used in the transflective liquid crystal display device shown in FIG. 1.
Figure 11:
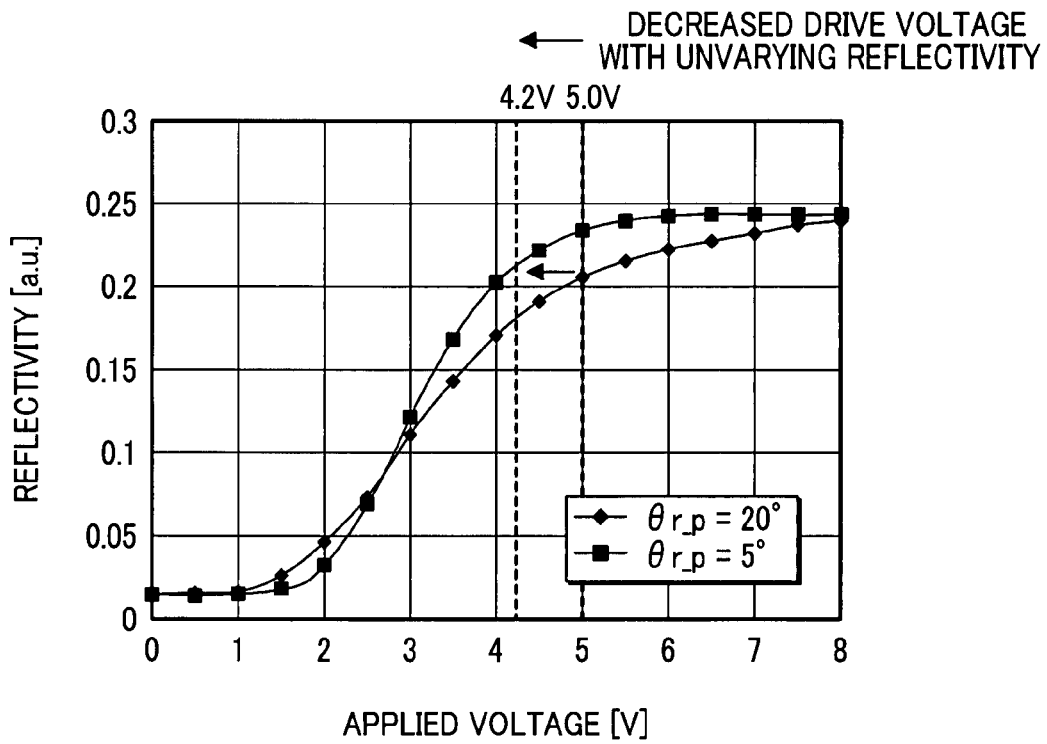
FIG. 11 is a graph illustrating a specific example (cases of θr=20° and 5°) in the θr dependence of the voltage-reflectivity characteristics for the reflective unit when a positive-type liquid crystal is used in the transflective liquid crystal display device shown in FIG. 1.

Here, as an example, the cases of θt_p=20° and θt_p=5° will be discussed. FIG. 10 illustrates the voltage-transmissivity characteristics of the transmissive unit 30, and FIG. 11 illustrates the voltage-reflectivity characteristics of the reflective unit 31. In FIG. 10, for θt_p=20°, a voltage at which the maximum transmissivity is obtained is about 5.0V, and this value serves as the maximum drive voltage Vmax of the transflective liquid crystal display device shown in FIG. 1. On the other hand, when changed to θt_p=5°, a voltage at which the maximum transmissivity is obtained becomes about 4.2 V, and this value serves as the maximum drive voltage Vmax of the transflective liquid crystal display device shown in FIG. 1. That is, the above-described fact means that the maximum drive voltage Vmax falls from 5.0V to 4.2V by the change of θt_p.

On the other hand, when attention is paid to the reflective unit 31, the comparison of the voltage-reflectivity characteristics for θr_p=20° (Vmax=5.0V) and θr_p=5° (Vmax=4.2V)) in FIG. 11 implies that the voltage-reflectivity characteristics for θr_p=5° is shifted to the low-voltage side with the improved reflective characteristics. However, since the drive voltage is decided by Vmax of the transmissive unit 30, the comparison of the reflectivity in each drive voltage results in a conclusion that the reflectivity is approximately same for θr_p=20° and 5°.

This is because the drive voltage of the reflective unit 31 is dependent on the display properties of the transmissive unit 30 and the reflective unit 31 is not necessarily driven by a drive voltage at which the reflective efficiency is high.

Embodiment 1

The transflective liquid crystal display device according to Embodiment 1 is different from the transflective liquid crystal display device shown in FIG. 1 with respect to the shape of the pixel electrode (PIX), however other structure is the same as that of the transflective liquid crystal display device shown in FIG. 1. Therefore, the transflective liquid crystal display device according to Embodiment 1 is hereafter explained focusing on the difference with the transflective liquid crystal display device shown in FIG. 1.

Figure 12:
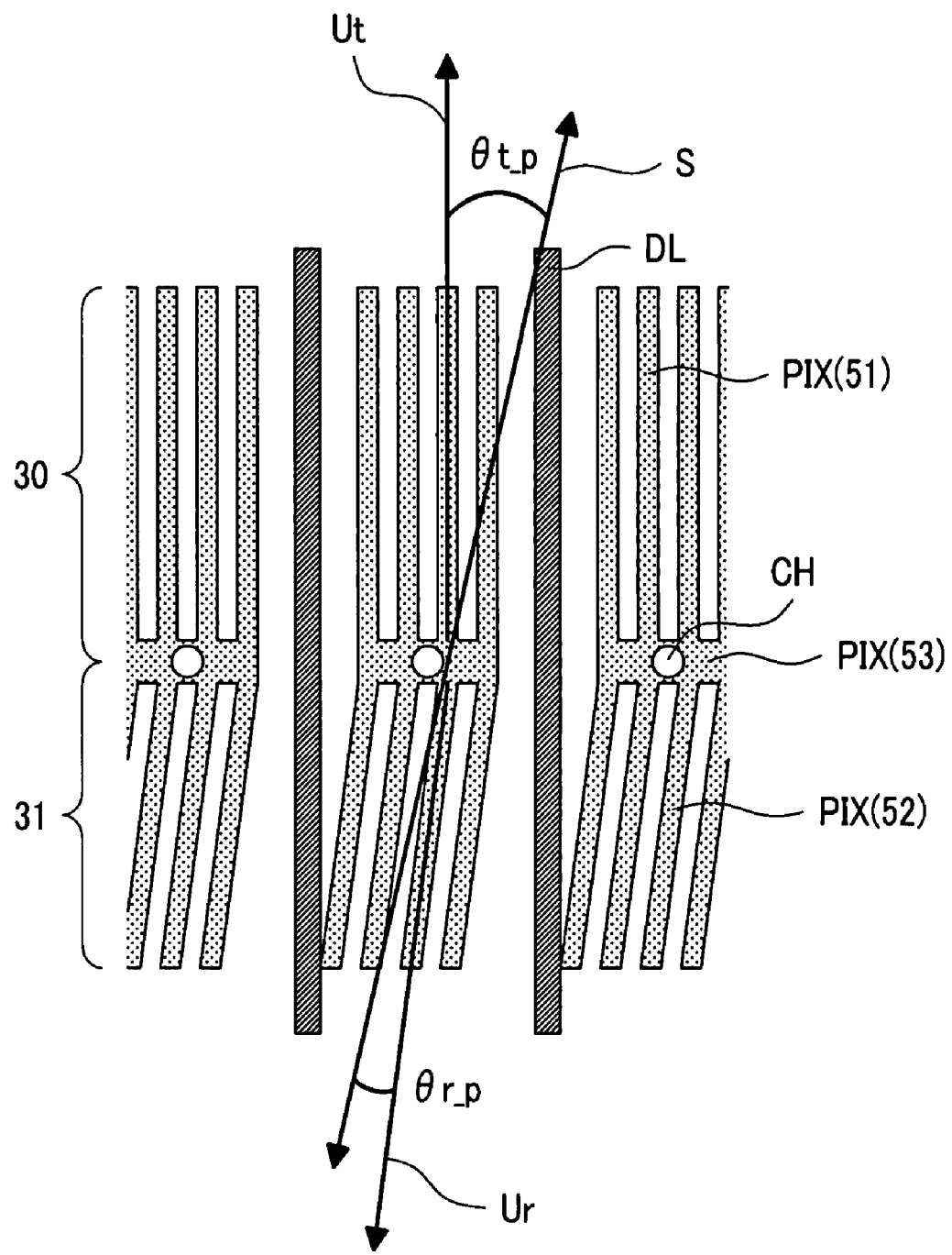
FIG. 12 is a graph illustrating the relationship between an initial liquid crystal alignment direction and a projection direction of a pixel electrode when a positive-type liquid crystal is used in the transflective liquid crystal display device according to Embodiment 1 of the present invention.

FIG. 12 shows the relationship between the initial liquid crystal alignment direction (S) and the projection direction of the pixel electrode (PIX), when the positive-type liquid crystal is used in the transflective liquid crystal display device according to Embodiment 1 of the present invention.

When a narrower angle among angles formed by the initial liquid crystal alignment direction (S) of the liquid crystal layer (LC) and the projection direction (Ut) of the pixel electrode (PIX) (the linear section 51) of the transmissive unit 30 is defined as θt_p, and when a narrower angle among angles formed by the initial liquid crystal alignment direction (S) of the liquid crystal layer (LC) and the projection direction (Ur) of the pixel electrode (PIX) (the linear section 52) of the reflective unit 31 is defined as θr_p, then, the transflective liquid crystal display device according to Embodiment 1 satisfies the relation of |θt_p|>|θr_p| when the positive-type liquid crystal is used.

Figure 13:
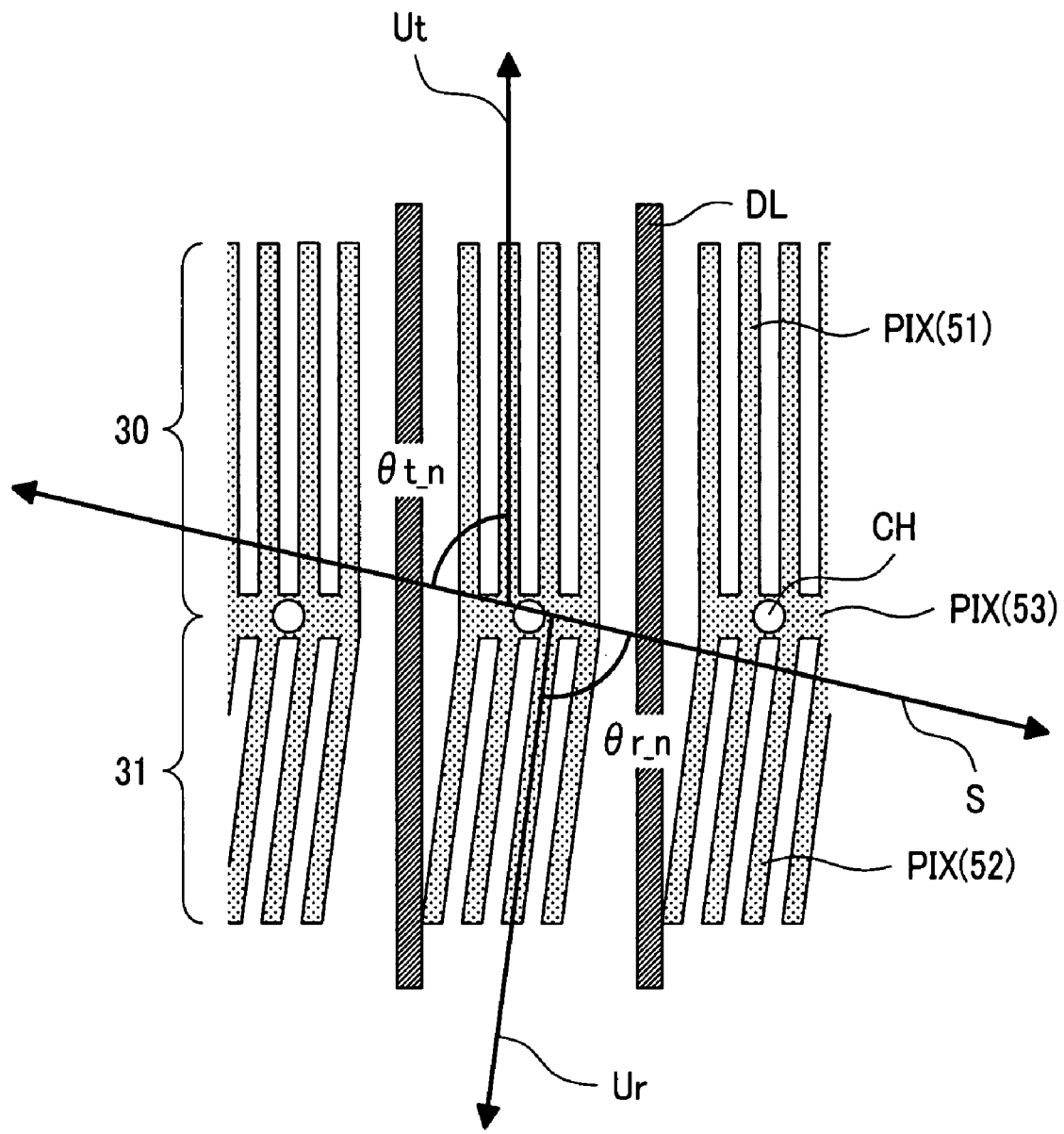
FIG. 13 is a graph illustrating the relationship between an initial liquid crystal alignment direction and a projection direction of a pixel electrode when a negative-type liquid crystal is used in the transflective liquid crystal display device according to Embodiment 1 of the present invention.

FIG. 13 shows the relationship between the initial liquid crystal alignment direction (S) and the projection direction of the pixel electrode (PIX), when the negative-type liquid crystal is used in the transflective liquid crystal display device according to Embodiment 1 of the present invention.

When a narrower angle among angles formed by the initial liquid crystal alignment direction (S) of the liquid crystal layer (LC) and the projection direction (Ut) of the pixel electrode (PIX) (the linear section 51) of the transmissive unit 30 is defined as θt_n, and when a narrower angle among angles formed by the initial liquid crystal alignment direction (S) of the liquid crystal layer (LC) and the projection direction (Ur) of the pixel electrode (PIX) (the linear section 52) of the reflective unit 31 is defined as θr_n, then, the transflective liquid crystal display device according to Embodiment 1 satisfies the relation of |θr_n|>|θt_n| when the negative-type liquid crystal is used.

The relation of |θt_p|>|θr_p| in a case where the positive-type liquid crystal is used (refer to FIG. 12) and the relation of |θr_n|>|θt_n| in a case where the negative-type liquid crystal is used (refer to FIG. 13) can be satisfied by projecting the pixel electrode (PIX) (the linear section 51) of the transmissive unit 30 obliquely with respect to the pixel electrode (PIX) (the linear section 52) of the reflective unit 31. In other words, these relations can be satisfied by projecting obliquely, with respect to the video line (DL), either pixel electrode (PIX) (the linear sections 51 or 52) of the pixel electrode (PIX) (the linear section 51) of the transmissive unit 30 or the pixel electrode (PIX) (the linear section 52) of the reflective unit 31.

In Embodiment 1, by projecting the pixel electrode (PIX) (the linear section 52) of the reflective unit 31 obliquely with respect to the projection direction of the video line (DL), the relation of |θt_p|>|θr_p| is satisfied in a case where the positive-type liquid crystal is used and the relation of |θr_n|>|θt_n| is satisfied in a case where the negative-type liquid crystal is used.

Here, the present invention is compared with the conventional example.

Figure 14A:
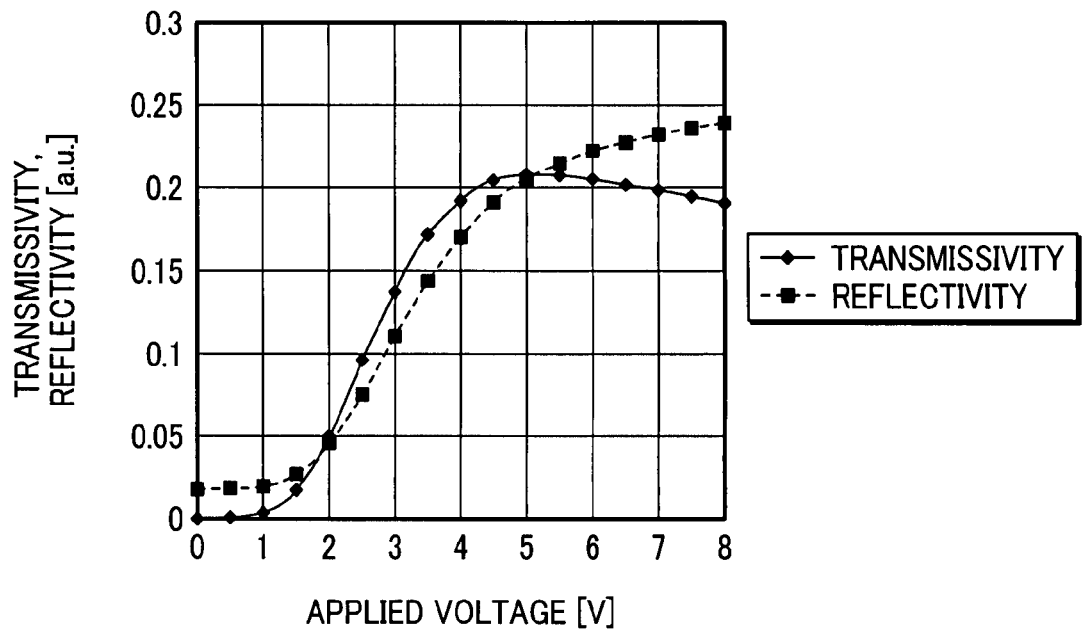
FIG. 14A is a graph illustrating the voltage-transmissivity characteristics of a transmissive unit and the voltage-reflectivity characteristics of a reflective unit when a positive-type liquid crystal is used in the transflective liquid crystal display device shown in FIG. 1.

FIG. 14A shows the voltage-transmissivity characteristics of the transmissive unit 30 and the voltage-reflectivity characteristics of the reflective unit 31 when the positive-type liquid crystal is used in the transflective liquid crystal display device shown in FIG. 1.

Figure 14B:
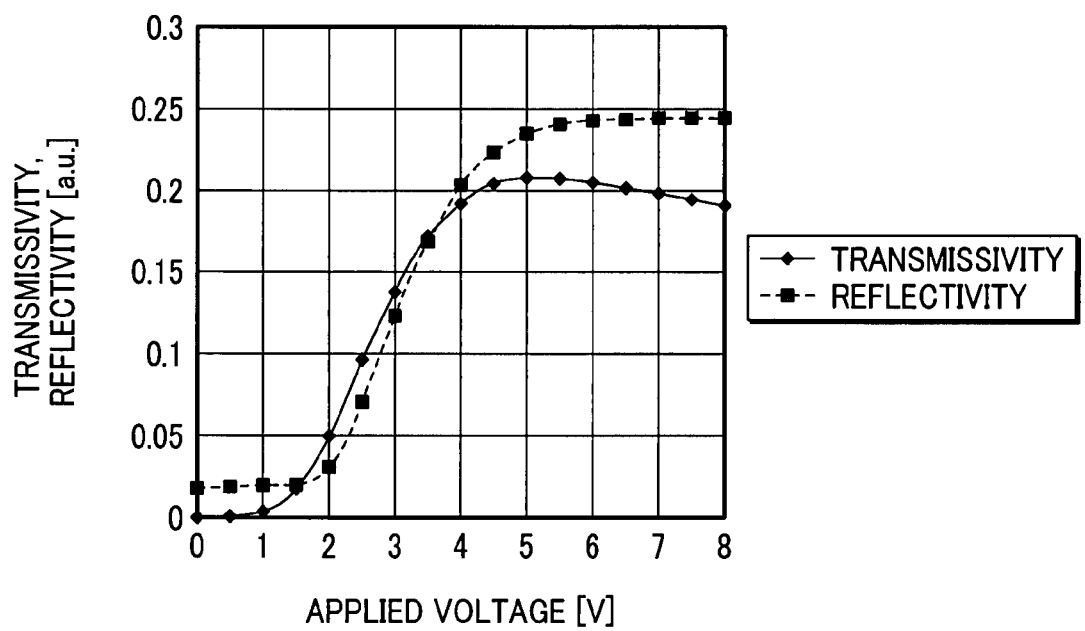
FIG. 14B is a graph illustrating the voltage-transmissivity characteristics of a transmissive unit and the voltage-reflectivity characteristics of a reflective unit when a positive-type liquid crystal is used in the transflective liquid crystal display device according to Embodiment 1 of the present invention.

FIG. 14B shows the voltage-transmissivity characteristics of the transmission section 30 and the voltage-reflectivity characteristics of the reflective unit 31 when the positive-type liquid crystal is used in the transflective liquid crystal display device according to Embodiment 1.

In the example shown in FIG. 14A, the shape of the voltage-transmissivity characteristics of the transmissive unit 30 and the shape of the voltage-reflectivity characteristics of the reflective unit 31 are greatly different, and especially, the voltages at which the transmissivity and the reflectivity attain the respective maxima are greatly separated. In this case, the drive voltage is set to about 5.0 V at which the transmissivity of the transmissive unit 30 exhibits the maximum; however, at this voltage, the reflectivity of the reflective unit 31 becomes quite low.

On the other hand, in the present embodiment shown in FIG. 14B, the shape of the voltage-transmissivity characteristics of the transmissive unit 30 and the shape of the voltage-reflectivity characteristics of the reflective unit 31 are closely analogous. In this case, the drive voltage is set to about 5.0 V at which the transmissivity of the transmissive unit 30 exhibits the maximum, and at this voltage, the reflectivity of the reflective unit 31 also exhibits nearly the maximum value. Specifically, compared with the conventional example, the reflectivity as high as about 13% is obtained, claiming that the effect of the present invention is very great.

In the IPS-mode transflective liquid crystal display device, the voltage-transmissivity characteristics of the transmissive unit 30 and the voltage-reflectivity characteristics of the reflective unit 31 are shifted to the low-voltage side or to the high-voltage side, depending on the size of the cell gap length, the angle of the pixel electrode (PIX) to the initial liquid crystal alignment direction (S) of the liquid crystal layer (LC), or the like. Since the reflective unit 31 has the narrow cell gap length compared with the transmissive unit 30, the voltage-reflectivity characteristics of the reflective unit 31 tends to be shifted to the high-voltage side, compared with the voltage-transmissivity characteristics of the transmissive unit 30. However, the voltage-reflectivity characteristics of the reflective unit 31 can be shifted to the low-voltage side by changing appropriately the projection direction of the pixel electrode (PIX) in the transmissive unit 30 and the reflective unit 31, as in Embodiment 1.

Consequently, since the shape of the voltage-transmissivity characteristics of the transmissive unit 30 and the shape of the voltage-reflectivity characteristics of the reflective unit 31 become closely analogous, a high reflectivity is obtained as well in the reflective unit 31 for the voltage at which the maximum transmissivity is obtained in the transmissive unit 30.

Figure 15:
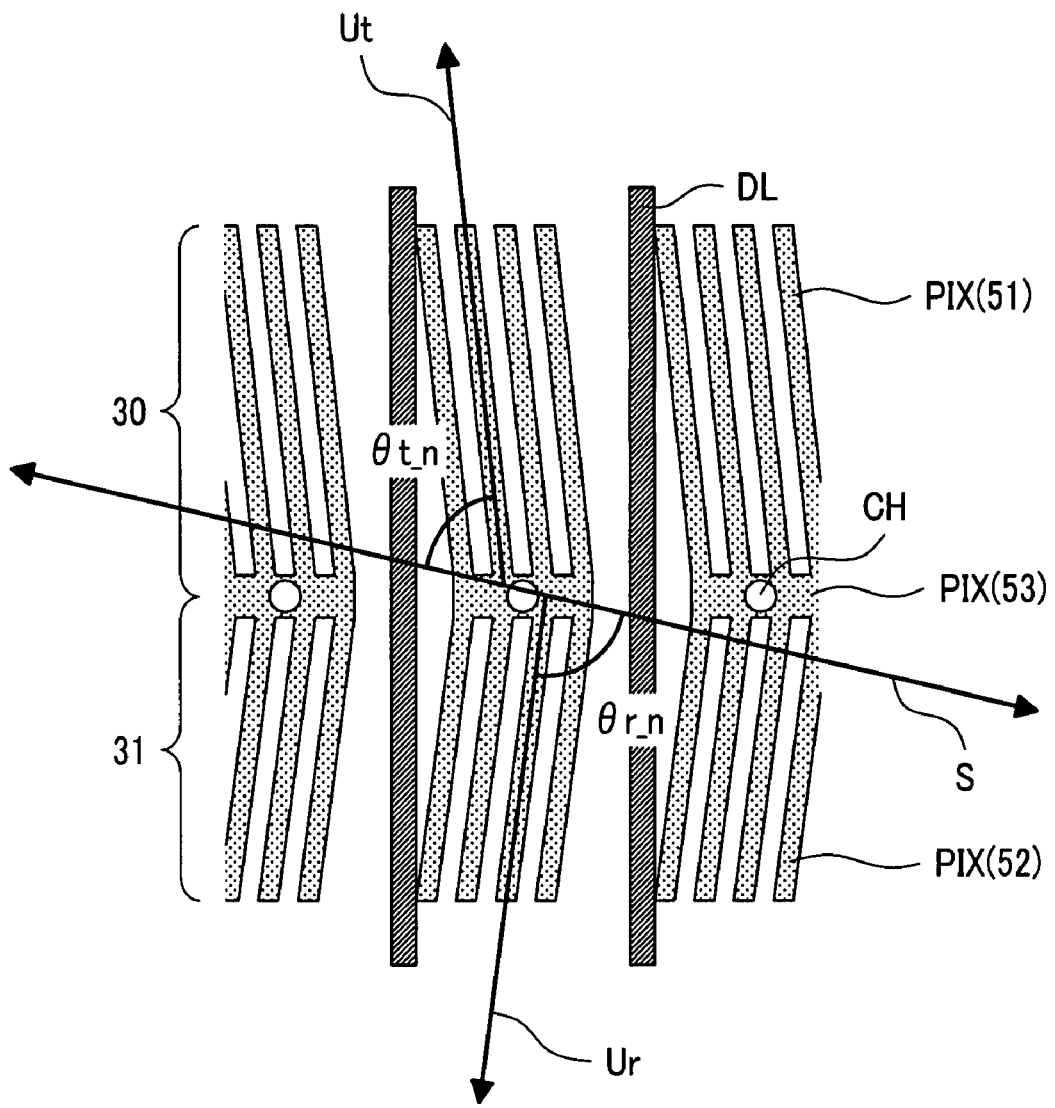
FIG. 15 is a graph illustrating the relationship between an initial liquid crystal alignment direction and a projection direction of a pixel electrode when a negative-type liquid crystal is used in the transflective liquid crystal display device as a modified example according to Embodiment 1 of the present invention.

FIG. 15 is a graph illustrating the relationship between an initial liquid crystal alignment direction (S) and a projection direction of a pixel electrode (PIX) when a negative-type liquid crystal is used in the transflective liquid crystal display device as a modified example according to Embodiment 1 of the present invention.

In Embodiment 1, the relation of $|\theta r\_n|>|\theta t\_n|$ for the negative-type liquid crystal is satisfied by projecting the pixel electrode (PIX) (the linear section 52) of the reflective unit 31 obliquely to the video line (DL). In the present modified example, the relation of $|\theta r\_n|>|\theta t\_n|$ for the negative-type liquid crystal is satisfied by projecting the pixel electrode (PIX) (the linear section 51) of the transmissive unit 30 and the pixel electrode (PIX) (the linear section 52) of the reflective unit 31 both obliquely to the video line (DL), for example, by bending the pixel electrode (PIX) (the linear section 51) of the transmissive unit 30 and the pixel electrode (PIX) (the linear section 52) of the reflective unit 31, across the connecting section 53 of the pixel electrode (PIX), so that both pixel electrodes may describe a figure of V.

In addition, although not shown, the relation of $|\theta t\_p|>|\theta r\_p|$ in a case where the positive-type liquid crystal is used can also be satisfied by projecting the pixel electrode (PIX) (the linear section 51) of the transmissive unit 30 and the pixel electrode (PIX) (the linear section 52) of the reflective unit 31 obliquely to the video line (DL).

In the modified example constructed in this way, it becomes possible to improve the reflective efficiency of the transflective liquid crystal display device, similarly as in Embodiment 1 as described above.

Embodiment 2

Figure 16:
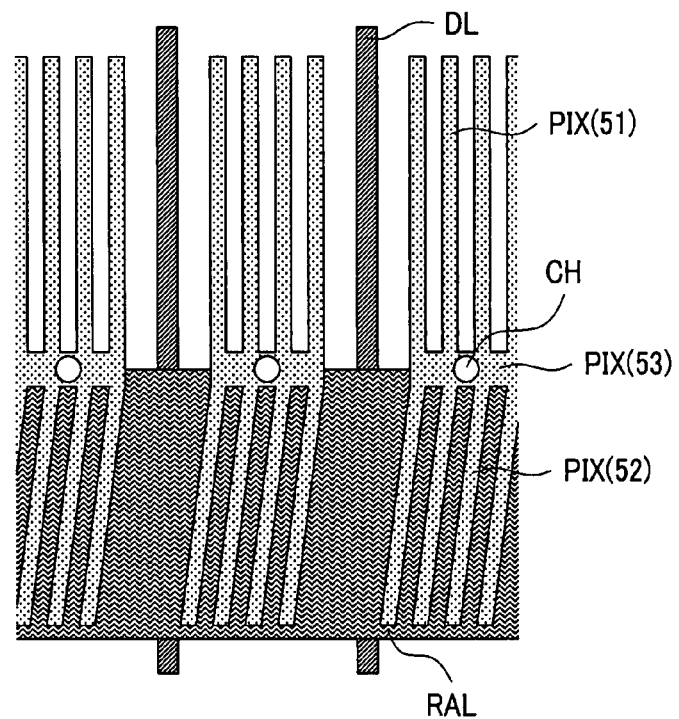
FIG. 16 is a top view illustrating one sub-pixel on the side of a TFT substrate in a transflective liquid crystal display device according to Embodiment 2 of the present invention.
Figure 17:
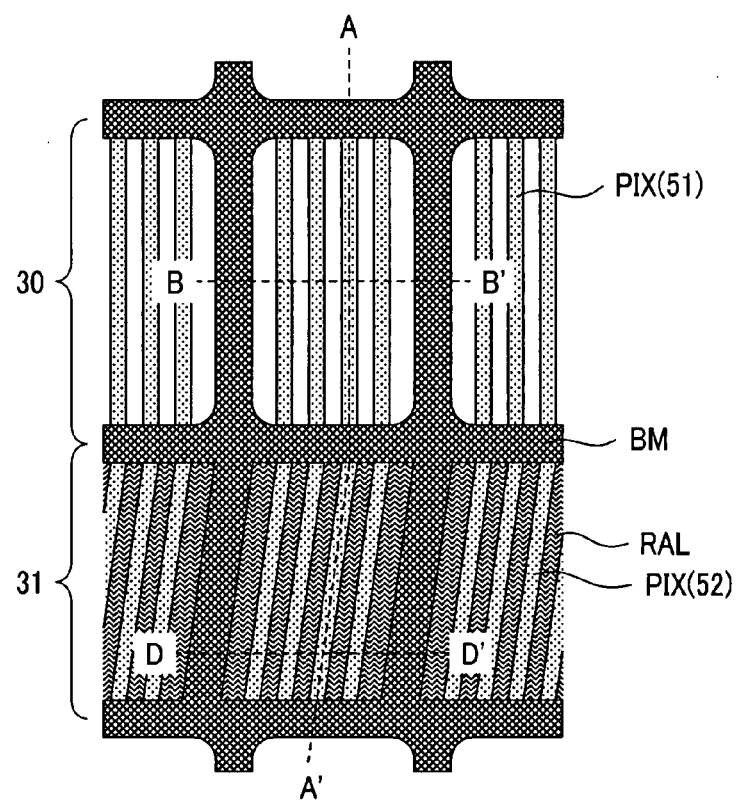
FIG. 17 is a top view illustrating one sub-pixel when the TFT substrate of FIG. 16 and a CF substrate are superposed.
Figure 18:
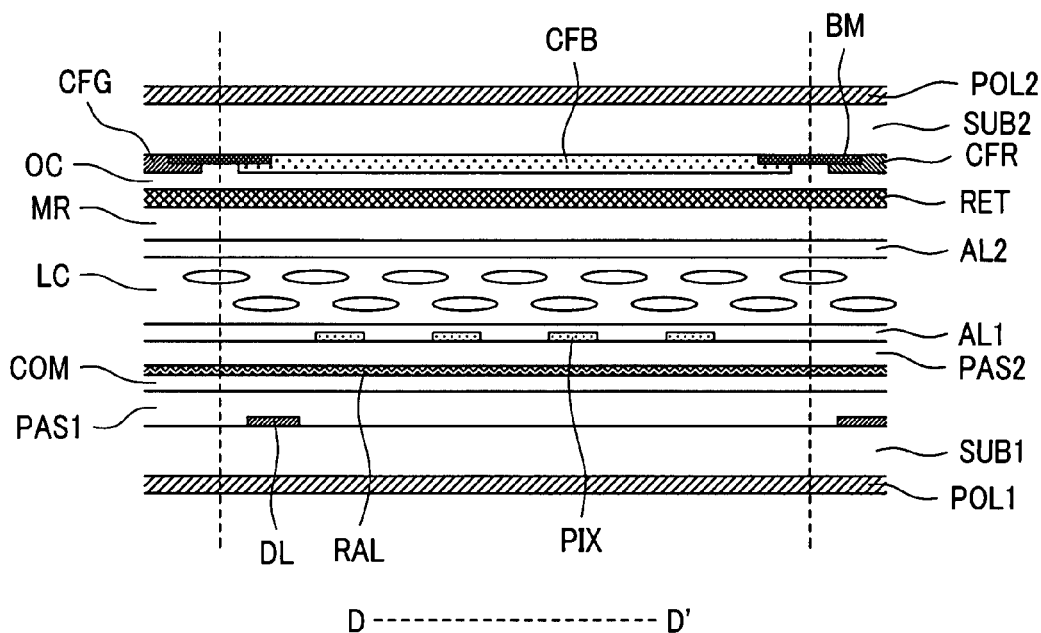
FIG. 18 is a cross-sectional view illustrating a cross-sectional structure taken along a line D-D' of FIG. 17.

FIG. 16 is a top view illustrating one sub-pixel on the side of a TFT substrate in a transflective liquid crystal display device according to Embodiment 2 of the present invention. FIG. 17 is a top view illustrating one sub-pixel when the TFT substrate of FIG. 16 and a CF substrate are superposed. FIG. 18 is a cross-sectional view illustrating a cross-sectional structure taken along the line D-D' of FIG. 17.

In addition, the cross-sectional view taken along the line A-A' and the cross-sectional view taken along the line B-B' of FIG. 17 are the same as in FIG. 3 and FIG. 4, respectively.

The transflective liquid crystal display device of Embodiment 2 possesses basically the same structure as that of the above-mentioned Embodiment 1, with the exception of the following structure.

Namely, in the transflective liquid crystal display device according to Embodiment 2, in concert with the fact that the pixel electrode (PIX) (the linear section 52) of the reflective unit 31 is bent, the light blocking film (BM), the reflective aperture area, and the color filters (CFR, CFG, CFB) of the reflective unit 31 are also bent. In other words, in concert with the fact that the pixel electrode (PIX) (the linear section 52) of the reflective unit 31 is slanting to the video line (DL), the light blocking film (BM), the reflective aperture area, and the color filters (CFR, CFG, CFB) of the reflective unit 31 are also slanting to the video line (DL). With such structure, the aperture ratio can be increased to the maximum extent.

Embodiment 3

Figure 19:
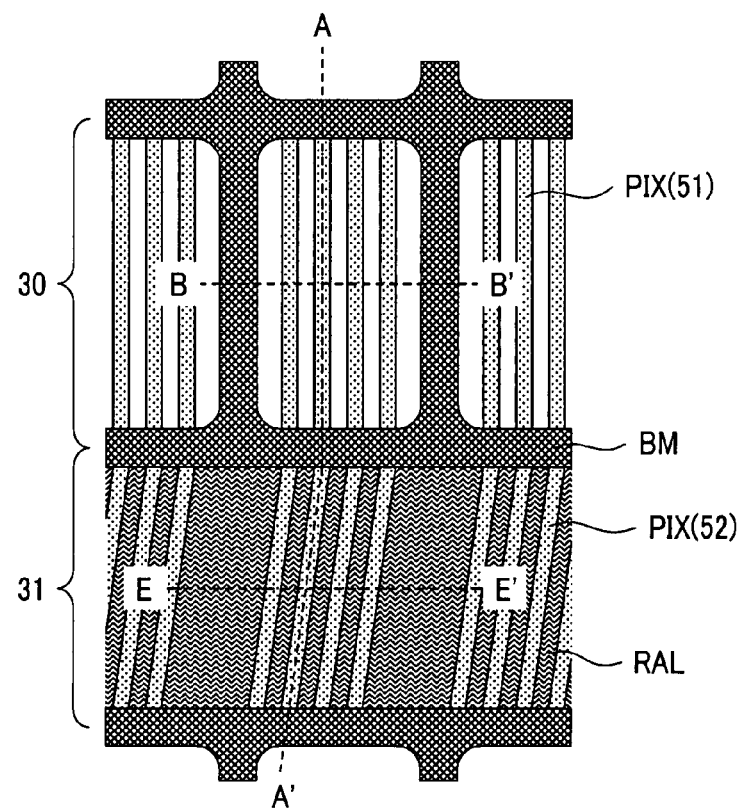
FIG. 19 is a top view illustrating one sub-pixel in a transflective liquid crystal display device according to Embodiment 3 of the present invention.
Figure 20:
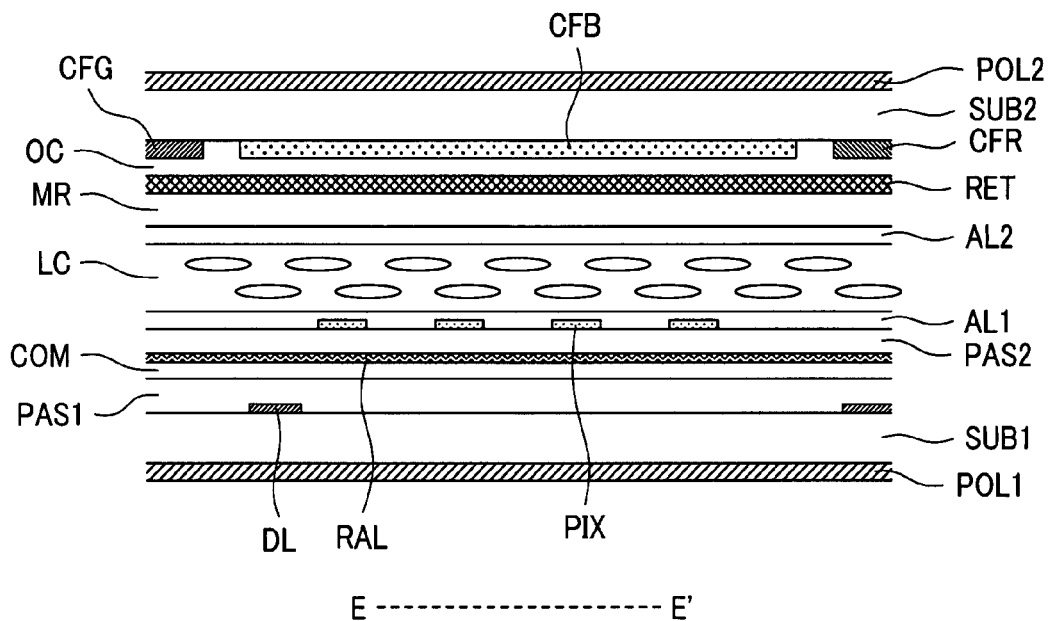
FIG. 20 is a cross-sectional view illustrating a cross-sectional structure taken along a line E-E' of FIG. 19.

FIG. 19 is a top view of one sub-pixel of the transflective liquid crystal display device according to Embodiment 3 of the present invention. FIG. 20 is a cross-sectional view illustrating a cross-sectional structure taken along the line E-E' of FIG. 19.

In addition, the cross-sectional view taken along the line A-A' and the cross-sectional view taken along the line B-B' of FIG. 19 are the same as in FIG. 3 and FIG. 4, respectively.

The transflective liquid crystal display device of Embodiment 3 possesses basically the same structure as that of the above-mentioned Embodiment 2, with the exception of the following structure.

That is, in the transflective liquid crystal display device of Embodiment 3, the light blocking film (BM) in the vertical direction (the projection direction of the video line (DL)) of the reflective unit 31 is removed, in other words, the light blocking film (BM) is not formed in the boundary area between sub-pixels which adjoin along with the scanning line (GL), in the reflective unit 31.

In the reflective unit 31, since the reflective electrode (RAL) exists above the video line (DL), it is not necessary to always prepare the light blocking film (BM) along the vertical direction (the projection direction of the video line (DL)) in the reflective unit 31. Moreover, by removing the light blocking film (BM) along the vertical direction (the projection direction of the video line (DL)) in the reflective unit 31, the removed portion can also contribute to reflection by that much; therefore, further improvement in reflectivity is expectable.

Embodiment 4

Figure 21:
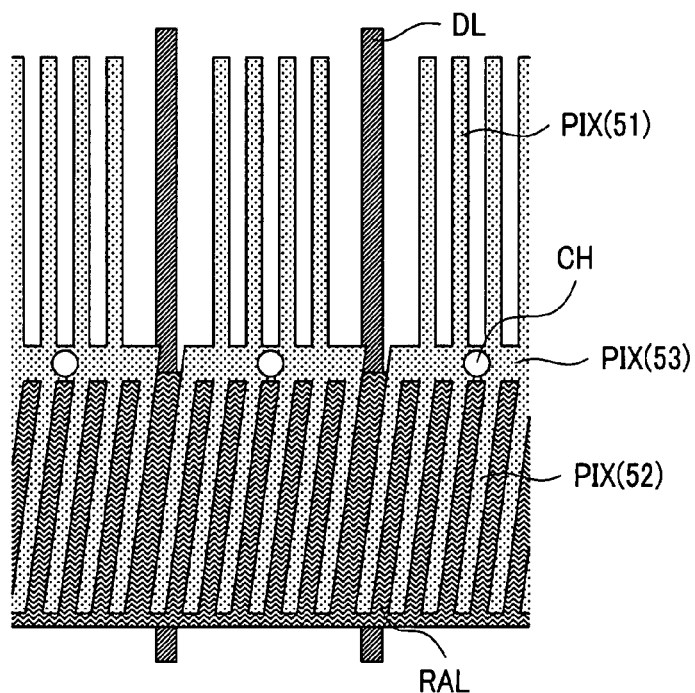
FIG. 21 is a top view illustrating one sub-pixel on the side of a TFT substrate in a transflective liquid crystal display device according to Embodiment 4 of the present invention.
Figure 22:
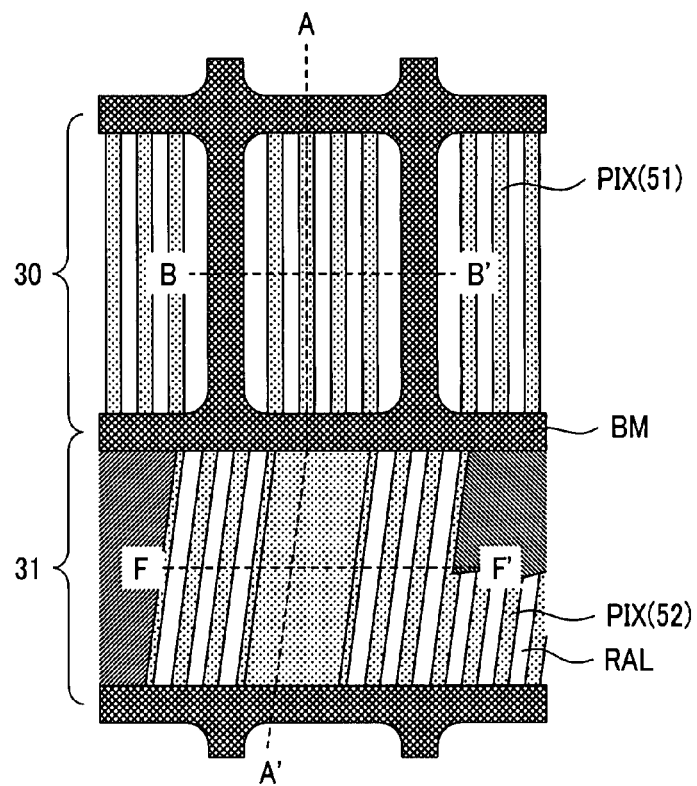
FIG. 22 is a top view illustrating one sub-pixel when the TFT substrate of FIG. 21 and a CF substrate are superposed.
Figure 23:
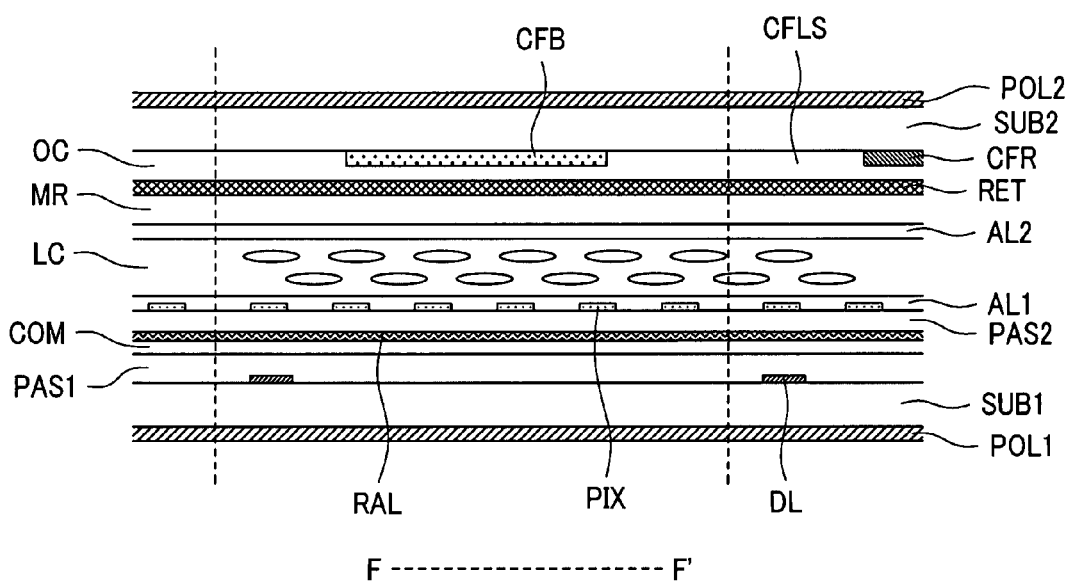
FIG. 23 is a cross-sectional view illustrating a cross-sectional structure taken along a line F-F' of FIG. 22.

FIG. 21 is a top view illustrating one sub-pixel on the side of a TFT substrate in a transflective liquid crystal display device according to Embodiment 4 of the present invention. FIG. 22 is a top view illustrating one sub-pixel when the TFT substrate of FIG. 21 and a CF substrate are superposed. FIG. 23 is a cross-sectional view illustrating a cross-sectional structure taken along the line F-F' of FIG. 22.

In addition, the cross-sectional view taken along the line A-A' and the cross-sectional view taken along the line B-B' of FIG. 22 are the same as in FIG. 3 and FIG. 4, respectively.

The transflective liquid crystal display device of Embodiment 4 possesses basically the same structure as that of the above-mentioned Embodiment 3, with the exception of the following structure.

That is, in the transflective liquid crystal display device of Embodiment 4, the number of elements in the linear section 52 of the pixel electrode (PIX) of the reflective unit 31 is more than the number of elements in the linear section 51 of the pixel electrode (PIX) of the transmissive unit 30. Moreover, a part of the color filters (CFR, CFG, CFB) of the reflective unit 31 is removed, and the aperture (CFLS) wider than the width of the light blocking film (BM) is prepared.

By increasing the number of elements in the linear section 52 of the pixel electrode (PIX) of the reflective unit 31, the neighborhood of the boundary area between sub-pixels adjoining along with the scanning line (GL) in the reflective unit 31 can be designed to contribute to the reflective display; therefore, the reflectivity can be improved further. Moreover, by removing a part of the color filters (CFR, CFG, CFB) to provide the aperture (CFLS), absorption of the light due to the color filters (CFR, CFG, CFB) can be lessened; therefore, the reflectivity can be improved furthermore.

Figure 24:
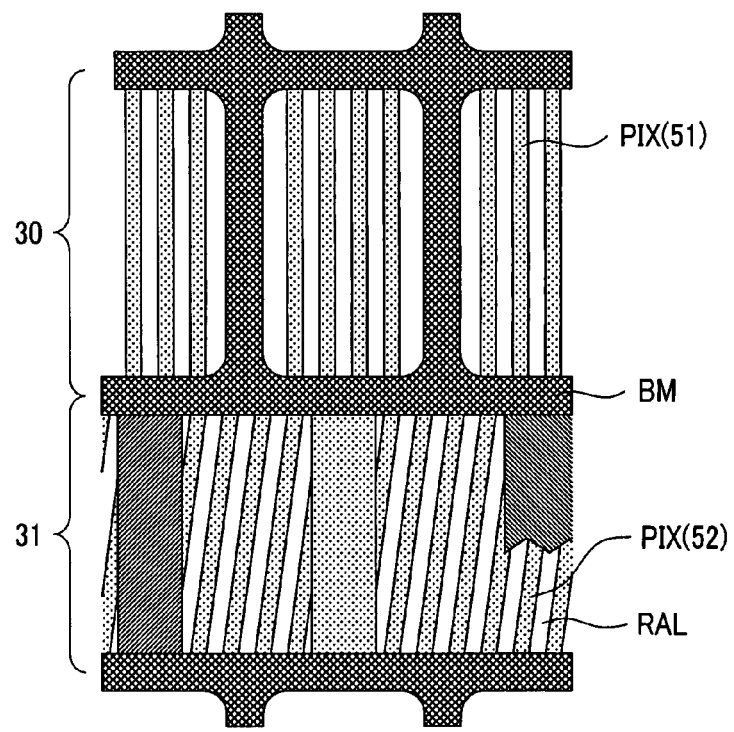
FIG. 24 is a top view illustrating one sub-pixel in a transflective liquid crystal display device as a modified example according to Embodiment 4 of the present invention.

FIG. 24 is a top view illustrating one sub-pixel in a transflective liquid crystal display device as a modified example according to Embodiment 4 of the present invention.

In Embodiment 4, a part of the color filters is removed obliquely and in parallel with the pixel electrode. However, it is not always necessary to remove a part of the color filters in the oblique direction. Alternatively, it may be removed without trouble in the vertical direction (the projection direction of the video line (DL)), as shown in FIG. 24 for example.

Embodiment 5

Figure 25:
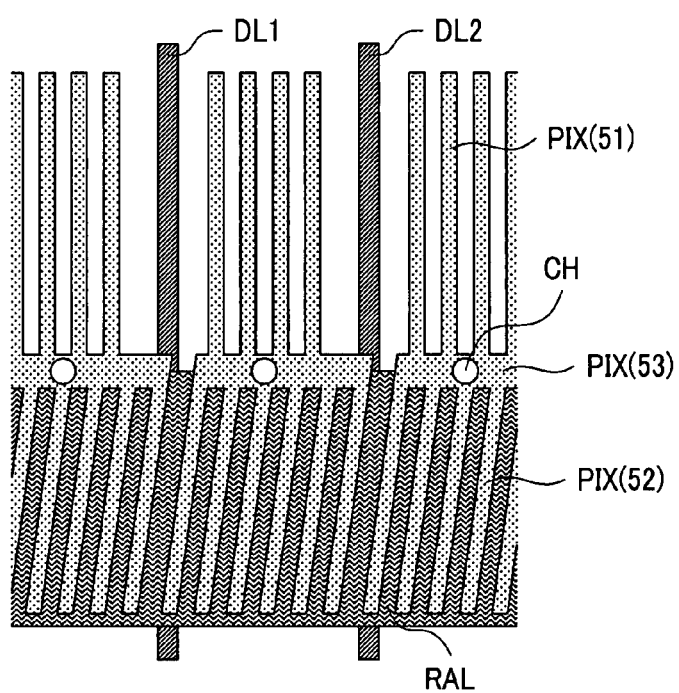
FIG. 25 is a top view illustrating one sub-pixel on the side of a TFT substrate in a transflective liquid crystal display device according to Embodiment 5 of the present invention.
Figure 26:
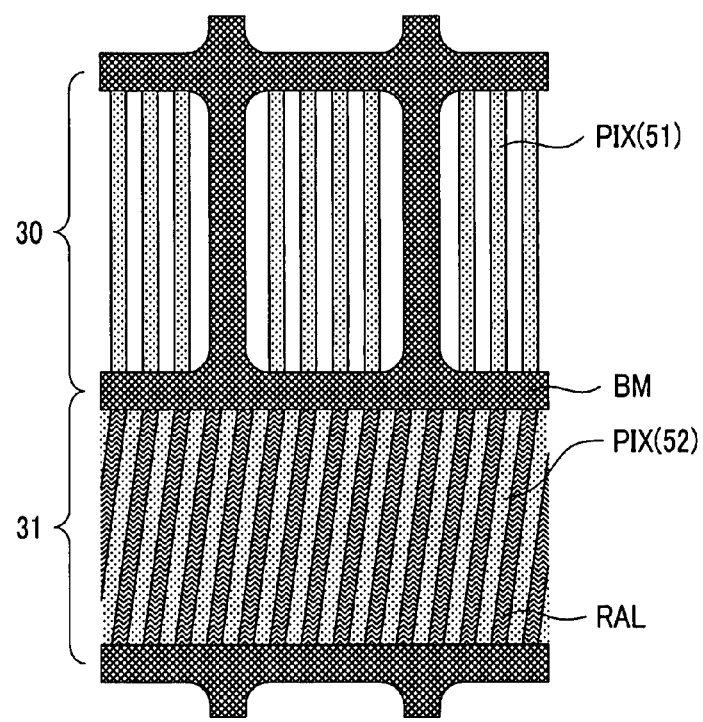
FIG. 26 is a top view illustrating one sub-pixel when the TFT substrate of FIG. 25 and a CF substrate are superposed.

FIG. 25 is a top view illustrating one sub-pixel on the side of a TFT substrate in a transflective liquid crystal display device according to Embodiment 5 of the present invention. FIG. 26 is a top view illustrating one sub-pixel when the TFT substrate of FIG. 25 and a CF substrate are superposed.

The transflective liquid crystal display device of Embodiment 5 possesses basically the same structure as that of the above-mentioned Embodiment 4, with the exception of the following structure.

That is, in the transflective liquid crystal display device of Embodiment 5, the whole pixel electrode (PIX) of one sub-pixel is arranged so as to fit into an area between two adjoining video lines (DL1, DL2). When the pixel electrode (PIX) runs off the video lines (DL1, DL2), a part of the pixels may get chipped at an end (a left end or a right end) of the liquid crystal display, thereby a display may be disturbed. Therefore, it is more desirable to fit the whole pixel electrode (PIX) of one sub-pixel into an area between the two video lines (DL1, DL2).

Embodiment 6

Figure 27:
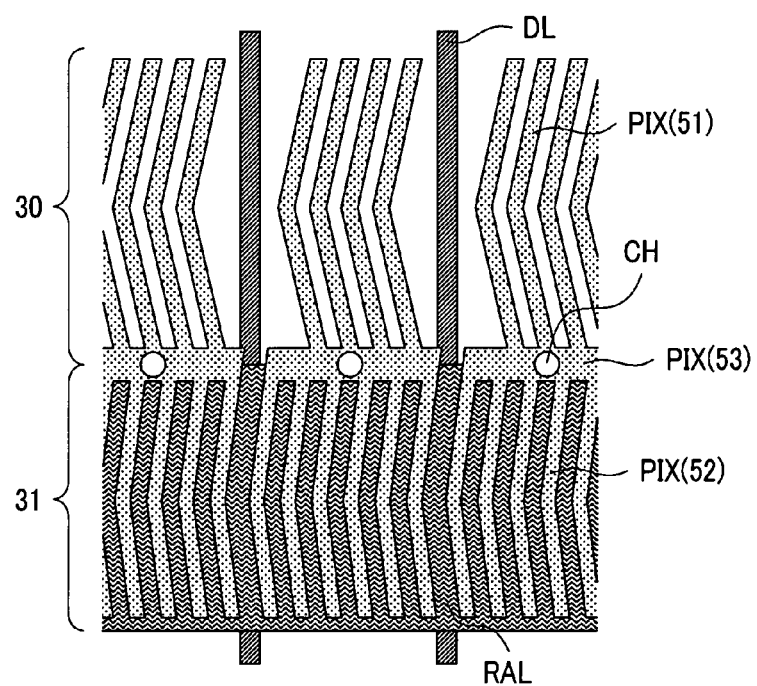
FIG. 27 is a top view illustrating one sub-pixel on the side of a TFT substrate in a transflective liquid crystal display device according to Embodiment 6 of the present invention.

FIG. 27 is a top view illustrating one sub-pixel on the side of a TFT substrate in a transflective liquid crystal display device according to Embodiment 6 of the present invention.

The transflective liquid crystal display device of Embodiment 6 possesses basically the same structure as that of the above-mentioned Embodiment 4, with the exception of the following structure.

That is, in the transflective liquid crystal display device of Embodiment 6, the pixel electrode (PIX) (the linear section 51) of the transmissive unit 30, and the pixel electrode (PIX) (the linear section 52) of the reflective unit 31 are bent in two directions, respectively. Thus, by bending the pixel electrode (PIX) (the linear section 51) of the transmissive unit 30 and the pixel electrode (PIX) (the linear section 52) of the reflective unit 31 in at least two directions, respectively, the aligned state of liquid crystal molecules of the liquid crystal layer (LC) can be made into a multi-domain alignment. Therefore, it becomes possible to expand the viewing angle thereof.

Figure 28:
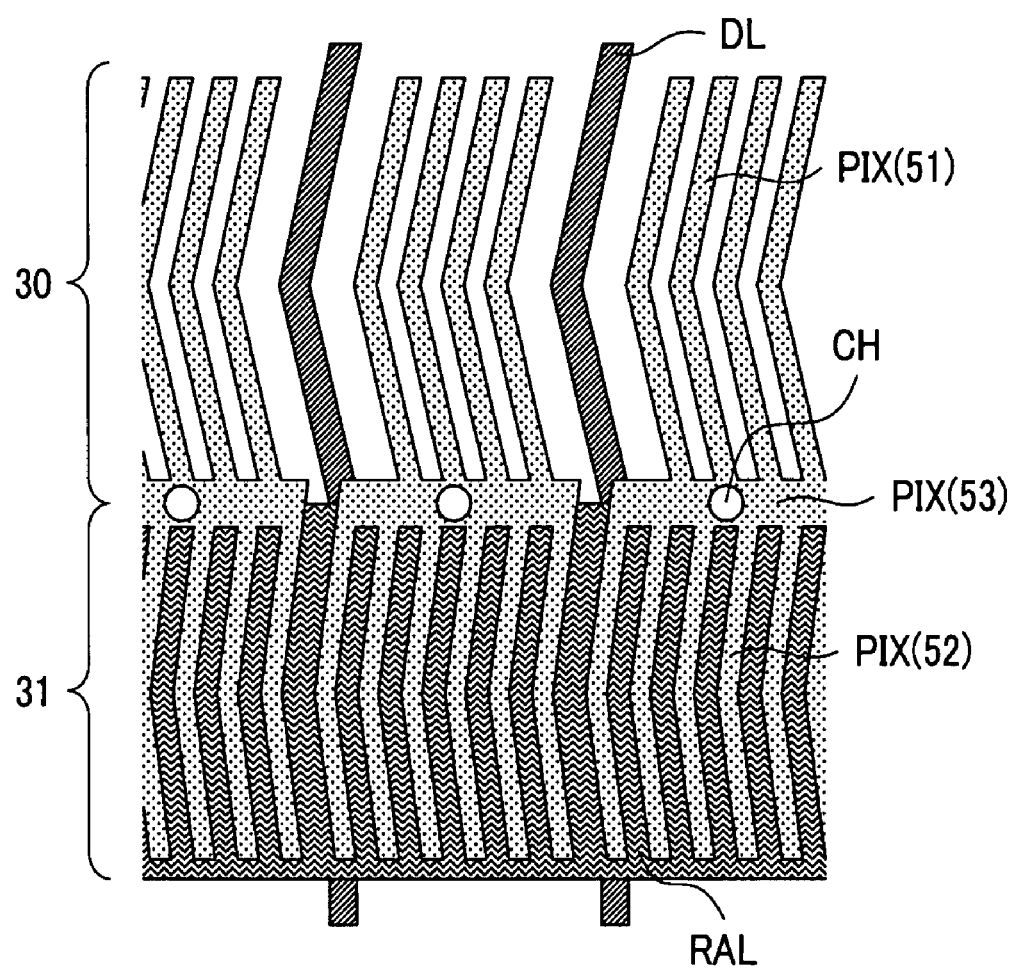
FIG. 28 is a top view illustrating one sub-pixel on the side of a TFT substrate in a transflective liquid crystal display device as a modified example according to Embodiment 6 of the present invention.

FIG. 28 is a top view illustrating one sub-pixel on the side of a TFT substrate in a transflective liquid crystal display device as a modified example according to Embodiment 6 of the present invention.

In the present modified example, the video line (DL) is also bent as the pixel electrode (PIX). The transmissive aperture ratio can be improved with such structure.

Embodiment 7

Figure 29:
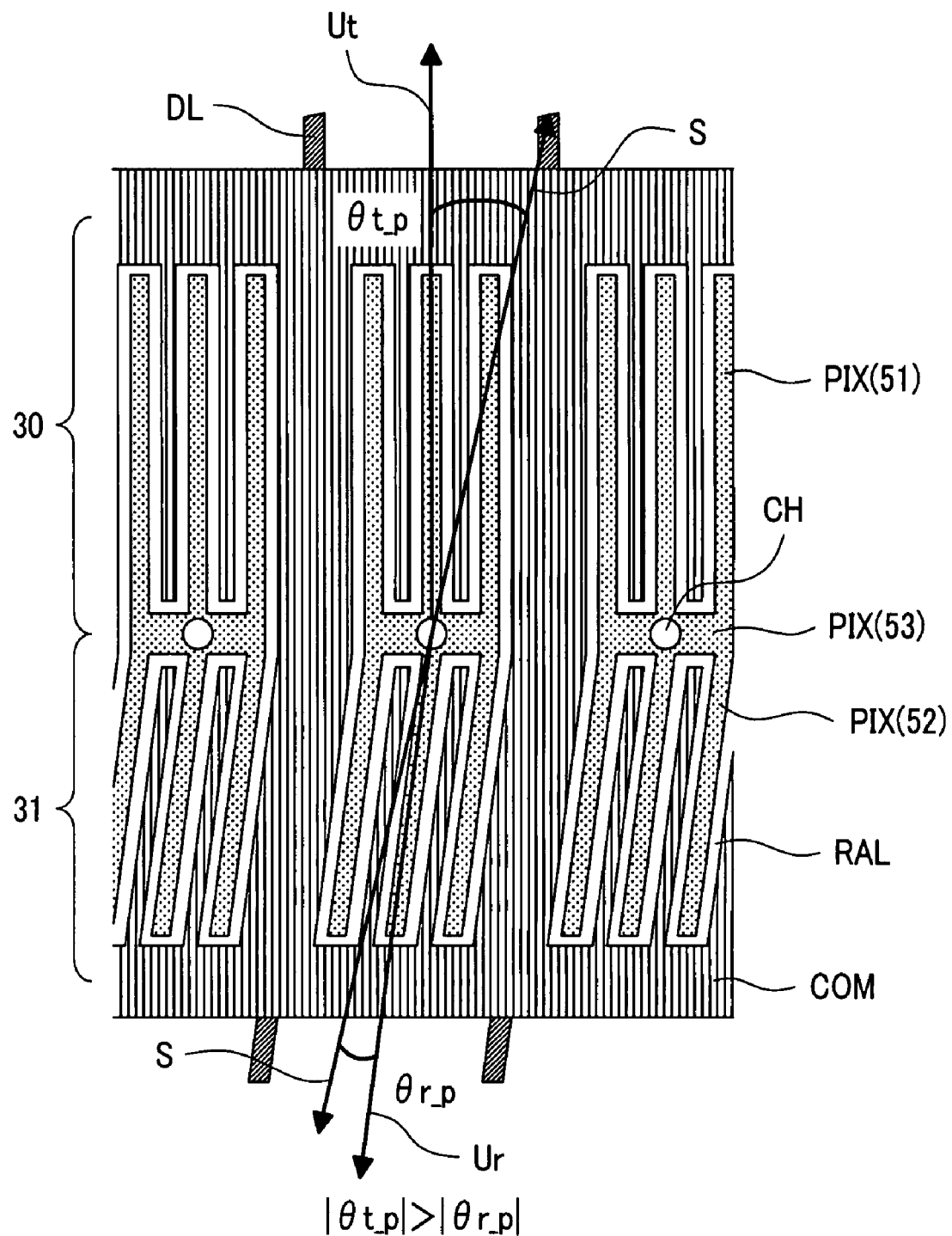
FIG. 29 is a graph illustrating the relationship between an initial liquid crystal alignment direction and a projection direction of a pixel electrode when a positive-type liquid crystal is used in the transflective liquid crystal display device according to Embodiment 7 of the present invention.
Figure 30:
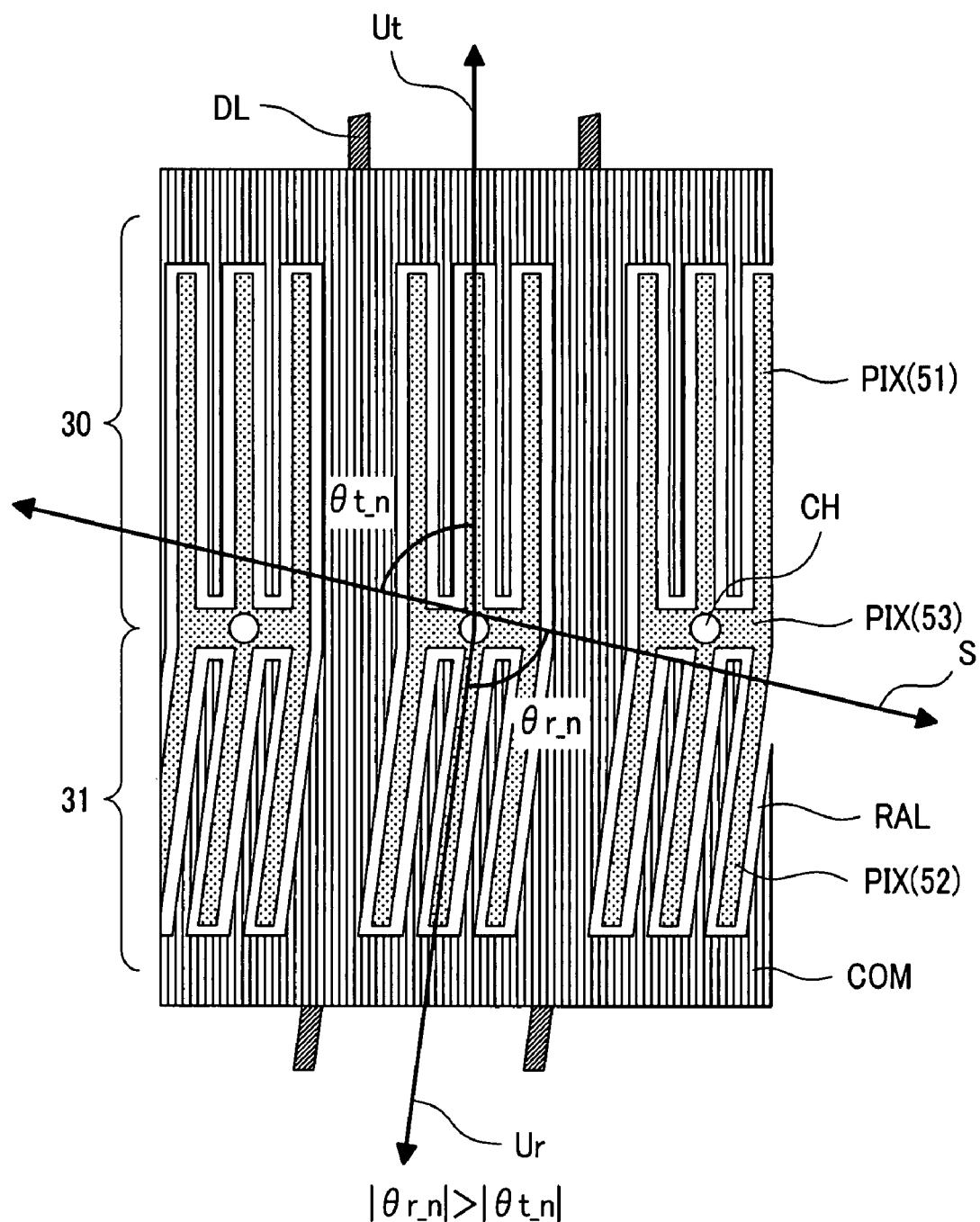
FIG. 30 is a graph illustrating the relationship between an initial liquid crystal alignment direction and a projection direction of a pixel electrode when a negative-type liquid crystal is used in the transflective liquid crystal display device according to Embodiment 7 of the present invention.

FIG. 29 is a graph illustrating the relationship between an initial liquid crystal alignment direction and a projection direction of a pixel electrode when a positive-type liquid crystal is used in the transflective liquid crystal display device according to Embodiment 7 of the present invention. FIG. 30 is a graph illustrating the relationship between an initial liquid crystal alignment direction and a projection direction of a pixel electrode when a negative-type liquid crystal is used in the transflective liquid crystal display device according to Embodiment 7 of the present invention.

In the transflective liquid crystal display device of Embodiment 7, the pixel electrode (PIX) and the opposed electrode (COM) are formed in the same layer, and the electrode structure is such that the opposed electrode (COM) is arranged additionally even between the linear sections (51, 52) of the pixel electrode (PIX) in the transmissive unit 30 and the reflective unit 31.

Thus, even in Embodiment 7 constructed in this way, the reflectivity of the transflective liquid crystal display device can be improved as in the Embodiment 1 described above.

While the invention made by the present inventors has been described specifically with reference to preferred embodiments described above, it will be apparent that the invention is not restricted to the embodiments but can be modified variously within a scope not departing the gist thereof.

What is claimed is:

1. A transflective liquid crystal display device comprising:
a liquid crystal display panel,
wherein the liquid crystal display panel includes
a pair of substrates,
a liquid crystal layer interposed between the pair of substrates,
a plurality of sub-pixels,
a transmissive unit and a reflective unit, the transmissive unit and the reflective unit being possessed by each of the plurality of sub-pixels, and
a pixel electrode and an opposed electrode, the pixel electrode and the opposed electrode being formed on one of the pair of substrates and possessed by each of the plurality of sub-pixels,
wherein the pixel electrode is shared by the transmissive unit as a first pixel electrode and shared by the reflective unit as a second pixel electrode in each of the plurality of sub-pixels, and
wherein, assuming that a narrower angle of angles formed by an initial liquid crystal alignment direction of the liquid crystal layer and a projection direction of the first pixel electrode shared by the transmissive unit is θt and that a narrower angle of angles formed by the initial liquid crystal alignment direction of the liquid crystal layer and a projection direction of the second pixel electrode shared by the reflective unit is θr, a relation of θt >θr is satisfied when the liquid crystal layer is a positive-type liquid crystal and a relation of θr >θt is satisfied when the liquid crystal layer is a negative-type liquid crystal.

2. The transflective liquid crystal display device according to claim 1,
wherein the second pixel electrode shared by the reflective unit projects obliquely with respect to the first pixel electrode shared by the transmissive unit.

3. The transflective liquid crystal display device according to claim 1,
wherein one of the pair of substrates includes a video line, and
wherein at least one of the first pixel electrode shared by the transmissive unit and the second pixel electrode shared by the reflective unit projects obliquely with respect to the video line.

4. The transflective liquid crystal display device according to claim 1,
wherein one of the pair of substrates includes a video line,
wherein the other of the pair of substrates includes a light blocking film formed corresponding to a boundary area between adjoining sub-pixels,
wherein at least one of the first pixel electrode shared by the transmissive unit and the second pixel electrode shared by the reflective unit is arranged obliquely with respect to the video line, and
wherein the light blocking film of the reflective unit is arranged obliquely with respect to the video line, in concert with the at least one of the first pixel electrode shared by the transmissive unit and the second pixel electrode shared by the reflective unit.

5. The transflective liquid crystal display device according to claim 1,
wherein one of the pair of substrates includes a scanning line,
wherein the other of the pair of substrates includes a light blocking film, and
wherein forming the light blocking film is omitted in a boundary area in the reflective unit between sub-pixels adjoining along the scanning line.

6. The transflective liquid crystal display device according to claim 1,
wherein the second pixel electrode shared by the reflective unit possesses more elements than the first pixel electrode shared by the transmissive unit.

7. The transflective liquid crystal display device according to claim 1,
wherein one of the pair of substrates includes a scanning line,
wherein the other of the pair of substrates includes a light blocking film and a color filter, and
wherein forming the light blocking film and the color filter is omitted and an aperture wider than a width of the light blocking film is provided, in a boundary area in the reflective unit between sub-pixels adjoining along the scanning line.

8. The transflective liquid crystal display device according to claim 1,
wherein one of the pair of substrates includes a plurality of video lines, and
wherein a pixel electrode of each of the sub-pixels is arranged between two adjoining video lines of the plurality of video lines.

9. The transflective liquid crystal display device according to claim 1,
wherein the first pixel electrode shared by the transmissive unit and the second pixel electrode shared by the reflective unit are each bending.

10. The transflective liquid crystal display device according to claim 9,
wherein one of the pair of substrates includes a video line, and
wherein the video line is bending in concert with a shape of one of the first pixel electrode shared by the transmissive unit and the second pixel electrode shared by the reflective unit.

11. A transflective liquid crystal display device comprising:
a liquid crystal display panel,
wherein the liquid crystal display panel includes
a pair of substrates,
a liquid crystal layer interposed between the pair of substrates,
a plurality of sub-pixels,
a transmissive unit and a reflective unit, the transmissive unit and the reflective unit being possessed by each of the plurality of sub-pixels, and
a pixel electrode and an opposed electrode, the pixel electrode and the opposed electrode being formed on one of the pair of substrates and possessed by each of the plurality of sub-pixels,
wherein the opposed electrode is planer in shape, and the pixel electrode is formed above the opposed electrode through an intermediate insulating film,
wherein the pixel electrode is shared by the transmissive unit as a first pixel electrode and shared by the reflective unit as a second pixel electrode in each of the plurality of sub-pixels, and
wherein, assuming that a narrower angle of angles formed by an initial liquid crystal alignment direction of the liquid crystal layer and a projection direction of the first pixel electrode shared by the transmissive unit is θt and that a narrower angle of angles formed by the initial liquid crystal alignment direction of the liquid crystal layer and a projection direction of the second pixel electrode shared by the reflective unit is θr, a relation of θt >θr is satisfied when the liquid crystal layer is a positive-type liquid crystal and a relation of θr >θt is satisfied when the liquid crystal layer is a negative-type liquid crystal.

12. The transflective liquid crystal display device according to claim 11,
wherein the second pixel electrode shared by the reflective unit projects obliquely with respect to the first pixel electrode shared by the transmissive unit.

13. The transflective liquid crystal display device according to claim 11,
wherein one of the pair of substrates includes a video line, and
wherein at least one of the first pixel electrode shared by the transmissive unit and the second pixel electrode shared by the reflective unit projects obliquely with respect to the video line.

14. The transflective liquid crystal display device according to claim 11,
wherein one of the pair of substrates includes a video line,
wherein the other of the pair of substrates includes a light blocking film formed corresponding to a boundary area between adjoining sub-pixels, wherein at least one of the first pixel electrode shared by the transmissive unit and the second pixel electrode shared by the reflective unit is arranged obliquely with respect to the video line, and wherein the light blocking film of the reflective unit is arranged obliquely with respect to the video line, in concert with the at least one of the first pixel electrode shared by the transmissive unit and the second pixel electrode shared by the reflective unit.

15. The transflective liquid crystal display device according to claim 11, wherein one of the pair of substrates includes a scanning line, wherein the other of the pair of substrates includes a light blocking film, and wherein forming the light blocking film is omitted in a boundary area in the reflective unit between sub-pixels adjoining along the scanning line.

16. A transflective liquid crystal display device comprising:

a liquid crystal display panel, wherein the liquid crystal display panel includes a pair of substrates, a liquid crystal layer interposed between the pair of substrates, a plurality of sub-pixels, a transmissive unit and a reflective unit, the transmissive unit and the reflective unit being possessed by each of the plurality of sub-pixels, and a pixel electrode and an opposed electrode, the pixel electrode and the opposed electrode being formed on one of the pair of substrates and possessed by each of the plurality of sub-pixels, wherein the other of the pair of substrates includes a step forming layer in a region facing the reflective unit, wherein the pixel electrode is shared by the transmissive unit as a first pixel electrode and shared by the reflective unit as a second pixel electrode in each of the plurality of sub-pixels, and wherein, assuming that a narrower angle of angles formed by an initial liquid crystal alignment direction of the liquid crystal layer and a projection direction of the first pixel electrode shared by the transmissive unit is $\theta t$ and that a narrower angle of angles formed by the initial liquid crystal alignment direction of the liquid crystal layer and a projection direction of the second pixel electrode shared by the reflective unit is $\theta r$, a relation of $\theta t > \theta r$ is satisfied when the liquid crystal layer is a positive-type liquid crystal and a relation of $\theta r > \theta t$ is satisfied when the liquid crystal layer is a negative-type liquid crystal.

17. The transflective liquid crystal display device according to claim 16, wherein the second pixel electrode shared by the reflective unit projects obliquely with respect to the first pixel electrode shared by the transmissive unit.

18. The transflective liquid crystal display device according to claim 16, wherein one of the pair of substrates includes a video line, and wherein at least one of the first pixel electrode shared by the transmissive unit and the second pixel electrode shared by the reflective unit projects obliquely with respect to the video line.

19. The transflective liquid crystal display device according to claim 16, wherein one of the pair of substrates includes a video line, wherein the other of the pair of substrates includes a light blocking film formed corresponding to a boundary area between adjoining sub-pixels, wherein at least one of the first pixel electrode shared by the transmissive unit and the second pixel electrode shared by the reflective unit is arranged obliquely with respect to the video line, and wherein the light blocking film of the reflective unit is arranged obliquely with respect to the video line, in concert with the at least one of the first pixel electrode shared by the transmissive unit and the second pixel electrode shared by the reflective unit.

20. The transflective liquid crystal display device according to claim 16, wherein one of the pair of substrates includes a scanning line, wherein the other of the pair of substrates includes a light blocking film, and wherein forming the light blocking film is omitted in a boundary area in the reflective unit between sub-pixels adjoining along the scanning line.

* * * * *